US012713379B2

(12) United States Patent
Duan et al.

(10) Patent No.: US 12,713,379 B2
(45) Date of Patent: Aug. 18, 2026

(54) OPERATIONAL ADAPTATION FOR RECONFIGURABLE INTELLIGENT SURFACE AIDED POSITIONING

(71) Applicant: QUALCOMM Incorporated, San Diego, CA (US)

(72) Inventors: Weimin Duan, San Diego, CA (US); Alexandros Manolakos, Escondido, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 18/260,957

(22) PCT Filed: Feb. 1, 2022

(86) PCT No.: PCT/US2022/014659
§ 371 (c)(1),
(2) Date: Jul. 11, 2023

(87) PCT Pub. No.: WO2022/169728
PCT Pub. Date: Aug. 11, 2022

(65) Prior Publication Data

US 2024/0107485 A1 Mar. 28, 2024

(30) Foreign Application Priority Data

Feb. 5, 2021 (GR) .............................. 20210100078

(51) Int. Cl.
*H04W 64/00* (2009.01)
*H04B 7/04* (2017.01)
*H04L 5/00* (2006.01)

(52) U.S. Cl.
CPC ........ *H04W 64/00* (2013.01); *H04B 7/04013* (2023.05); *H04L 5/0051* (2013.01)

(58) Field of Classification Search
CPC ... H04W 64/00; H04B 7/04013; H04L 5/0051
See application file for complete search history.

(56) References Cited

U.S. PATENT DOCUMENTS

2020/0267681 A1 8/2020 Ferrari et al.
2022/0014877 A1* 1/2022 Stare .................... G01S 5/0236

FOREIGN PATENT DOCUMENTS

CN 108110435 A 6/2018
CN 111093267 A 5/2020
(Continued)

OTHER PUBLICATIONS

International Search Report and Written Opinion—PCT/US2022/014659—ISA/EPO—May 18, 2022.
Taiwan Search Report—TW111104299—TIPO—May 17, 2025.

*Primary Examiner* — Natasha W Cosme
(74) *Attorney, Agent, or Firm* — Procopio, Cory, Hargreaves & Savitch LLP/QUALCOMM Incorporated

(57) ABSTRACT

Disclosed are techniques for wireless communication, and specifically for reconfigurable intelligent surface (RIS)-aided positioning. An example method of wireless communication performed by a base station includes determining a capability of a RIS, determining configuration information for a positioning reference signal, wherein the configuration information is based at least in part on the capability of the RIS, and transmitting a positioning signal based on the configuration information in a direction of the RIS.

20 Claims, 20 Drawing Sheets

(56) References Cited

FOREIGN PATENT DOCUMENTS

| | | | |
|---|---|---|---|
| CN | 111245494 | A | 6/2020 |
| CN | 111983560 | A | 11/2020 |
| WO | 2020096506 | A1 | 5/2020 |
| WO | 2020254031 | A1 | 12/2020 |

* cited by examiner

100
Location Server
172
Core Network
170
mmW BS
180
UE
182
184
122
134
UE
104
120
102
BS
UE
164
110
192
UE
190
STA
152
194
154
AP
150
UE
152
SC
102'
110'
SV
112
124

OPERATIONAL ADAPTATION FOR RECONFIGURABLE INTELLIGENT SURFACE AIDED POSITIONING

CROSS-REFERENCE TO RELATED APPLICATIONS

This application is the National Stage of International Application No. PCT/US2022/014659, filed Feb. 1, 2022, entitled "OPERATIONAL ADAPTATION FOR RECONFIGURABLE INTELLIGENT SURFACE AIDED POSITIONING," which claims the benefit of Greek Patent Application No. 20210100078, filed Feb. 5, 2021, entitled "OPERATIONAL ADAPTATION FOR RECONFIGURABLE INTELLIGENT SURFACE AIDED POSITIONING," both of which are assigned to the assignee hereof, and the entire contents of which are hereby incorporated herein by reference for all purposes.

BACKGROUND OF THE DISCLOSURE

1. Field of the Disclosure

Aspects of the disclosure relate generally to wireless communications and user equipment positioning.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An example method of wireless communication performed by a base station according to the disclosure includes determining a capability of a reconfigurable intelligent surface, determining configuration information for a positioning reference signal, wherein the configuration information is based at least in part on the capability of the reconfigurable intelligent surface, and transmitting a positioning signal based on the configuration information in a direction of the reconfigurable intelligent surface.

Implementations of such as method may include one or more of the following features. The capability of the reconfigurable intelligent surface may be provided to a network server. Determining the capability of the reconfigurable intelligent surface may include determining an accuracy of a phase shift control of the reconfigurable intelligent surface. Determining the capability of the reconfigurable intelligent surface may include determining a speed of a phase shift control of the reconfigurable intelligent surface. Determining the capability of the reconfigurable intelligent surface may include determining a beam shape of a beam reflected from the reconfigurable intelligent surface. The beam shape of the beam reflected from the reconfigurable intelligent surface may be based on a 3 dB beamwidth Determining the capability of the reconfigurable intelligent surface may include determining a power loss or a power gain of a beam reflected from the reconfigurable intelligent surface. Determining configuration information for the positioning reference signal may include determining a number of positioning reference signals to transmit in a positioning reference signal beam sweep. Determining configuration information for the positioning reference signal may include determining a time gap between transmitting two or more positioning reference signals. Determining the capability of the reconfigurable intelligent surface may include receiving capability information from a network server. Determining the capability of the reconfigurable intelligent surface may include receiving capability information from the reconfigurable intelligent surface.

An example method of wireless communication performed by a user equipment according to the disclosure includes receiving positioning assistance data from a network, determining a capability of a reconfigurable intelligent surface based on the positioning assistance data, receiving a reference signal from the reconfigurable intelligent surface, and obtaining a measurement value for the reference signal based at least in part on the capability of the reconfigurable intelligent surface.

Implementations of such a method may include one or more of the following features. Determining the capability of the reconfigurable intelligent surface may include determining an accuracy of a phase shift control of the reconfigurable intelligent surface. Determining the capability of the reconfigurable intelligent surface may include determining a speed of a phase shift control of the reconfigurable intelligent surface. Determining the capability of the reconfigurable intelligent surface may include determining a beam shape the reference signal. The beam shape of the reference signal may be based on a 3 dB beamwidth. Determining the capability of the reconfigurable intelligent surface may include determining a power loss or a power gain of the reference signal. Determining a transmit power for an uplink reference signal may be based at least in part on the power loss or the power gain of the reference signal. Obtaining the measurement value for the reference signal includes determining an angle of departure of the reference signal. Obtaining the measurement value for the reference signal may include determining an uncertainty of a beamwidth of the reference signal. Obtaining the measurement value for the reference signal may include determining a time of arrival of the reference signal.

An example apparatus according to the disclosure includes a memory, at least one transceiver, at least one processor communicatively coupled to the memory and the at least one transceiver, and configured to determine a capability of a reconfigurable intelligent surface, determine configuration information for a positioning reference signal, wherein the configuration information is based at least in part on the capability of the reconfigurable intelligent surface, and transmit a positioning signal based on the configuration information in a direction of the reconfigurable intelligent surface.

An example apparatus according to the disclosure includes a memory, at least one transceiver, at least one processor communicatively coupled to the memory and the at least one transceiver, and configured to receive positioning assistance data from a network, determine a capability of a reconfigurable intelligent surface based on the positioning assistance data, receive a reference signal from the reconfigurable intelligent surface, and obtain a measurement value for the reference signal based at least in part on the capability of the reconfigurable intelligent surface.

An example apparatus for wireless communication according to the disclosure includes means for determining a capability of a reconfigurable intelligent surface, means for determining configuration information for a positioning reference signal, wherein the configuration information is based at least in part on the capability of the reconfigurable intelligent surface, and means for transmitting a positioning signal based on the configuration information in a direction of the reconfigurable intelligent surface.

An example apparatus for wireless communication according to the disclosure includes means for receiving positioning assistance data from a network, means for determining a capability of a reconfigurable intelligent surface based on the positioning assistance data, means for receiving a reference signal from the reconfigurable intelligent surface, and means for obtaining a measurement value for the reference signal based at least in part on the capability of the reconfigurable intelligent surface.

An example non-transitory processor-readable storage medium comprising processor-readable instructions to cause one or more processors to transmit a positioning signal according to the disclosure includes code for determining a capability of a reconfigurable intelligent surface, code for determining configuration information for a positioning reference signal, wherein the configuration information is based at least in part on the capability of the reconfigurable intelligent surface, and code for transmitting the positioning signal based on the configuration information in a direction of the reconfigurable intelligent surface.

An example non-transitory processor-readable storage medium comprising processor-readable instructions to cause one or more processors to measure a reference signal according to the disclosure includes code for receiving positioning assistance data from a network, code for determining a capability of a reconfigurable intelligent surface based on the positioning assistance data, code for receiving the reference signal from the reconfigurable intelligent surface, and code for obtaining a measurement value for the reference signal based at least in part on the capability of the reconfigurable intelligent surface.

Items and/or techniques described herein may provide one or more of the following capabilities, as well as other capabilities not mentioned. A communication network may include one or more reconfigurable intelligent surfaces (RISes). Each RIS may be implemented with different materials and hardware and may have different capabilities. The different capabilities may include different limitations on accuracy and phase shift control speed. A base station or location server in the communication network may store information associated with the capabilities of the RISes. Reference signals may be adapted based on the capabilities of the RISes. The RIS capabilities may be provided to user equipment via positioning assistance data. Beam sweeping processes may utilize the RIS capability information. The position estimates based on reference signals reflected from a RIS may be improved. Uplink power settings may be adapted based on the capabilities of a RIS. Other capabilities may be provided and not every implementation according to the disclosure must provide any, let alone all, of the capabilities discussed.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
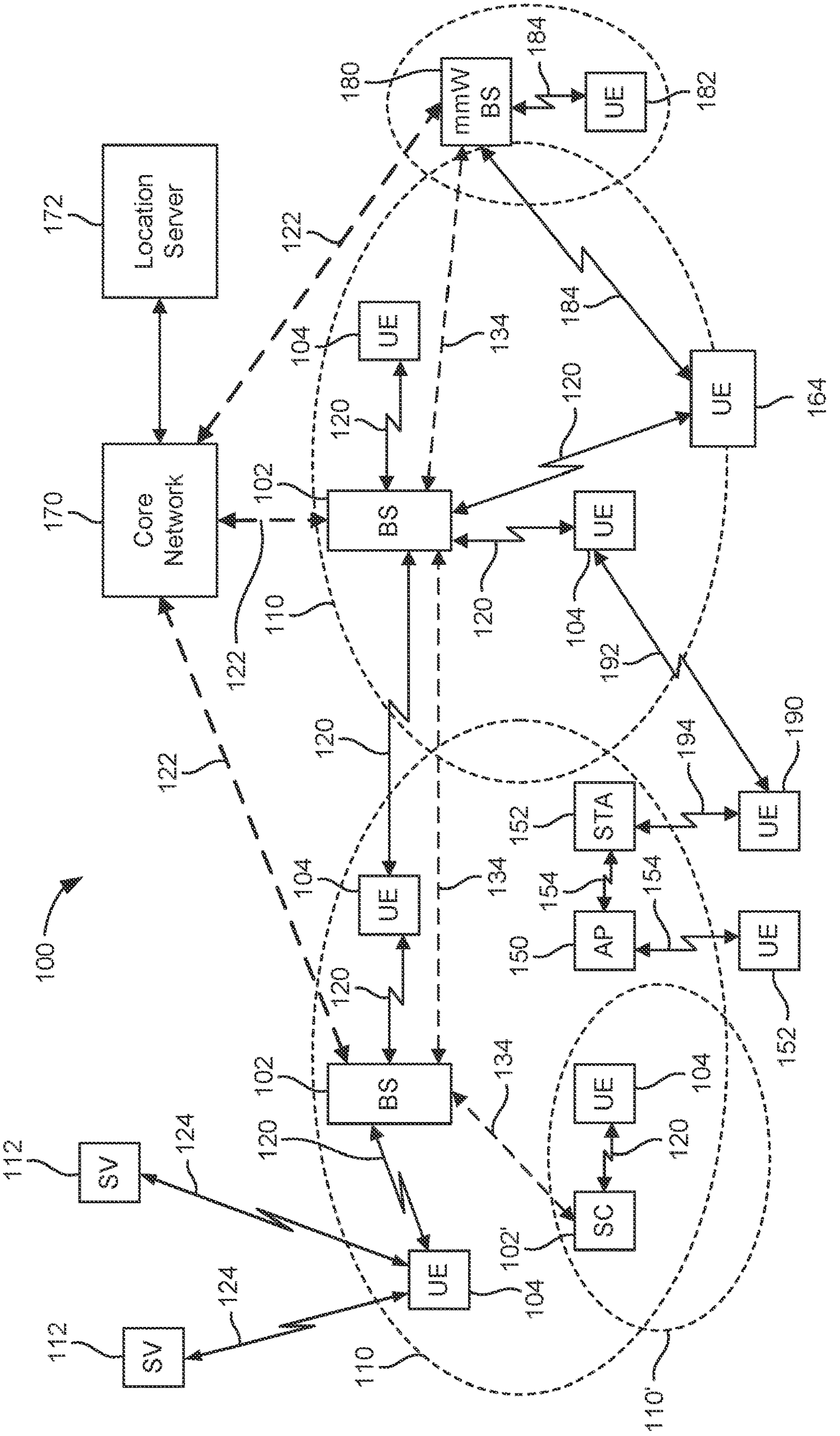
FIG. 1 illustrates an example wireless communications system, according to aspects of the disclosure.

Techniques are discussed herein for adapting reference signals and user equipment (UE) operation for RIS aided positioning. Different RIS are likely to have different capabilities and limitations which may impact the accuracy and signal processing of terrestrial positioning techniques. For example, since an RIS may be implemented with different materials and hardware, the varying configurations may have varying beam parameters and phase shift control capabilities. The stations transmitting and receiving positioning reference signals may be configured to adapt their respective signal processing procedures to utilize one or more RISes for positioning applications. The capabilities of a RIS may be included in positioning assistance data provided to a mobile device. Reference signal sweeping may be modified based on the capability of a RIS. The power loss or gain of a RIS reflection may be used to modify transmitter power. These are examples, and other examples of adaptation of reference signal positioning techniques to utilize RIS for positioning may be implemented.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carer over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive signals 124 for deriving geo location information from the SVs 112. An SPS typically includes a system of transmitters (e.g., SVs 112) positioned to enable receivers (e.g., UEs 104) to determine their location on or above the Earth based, at least in part, on signals received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
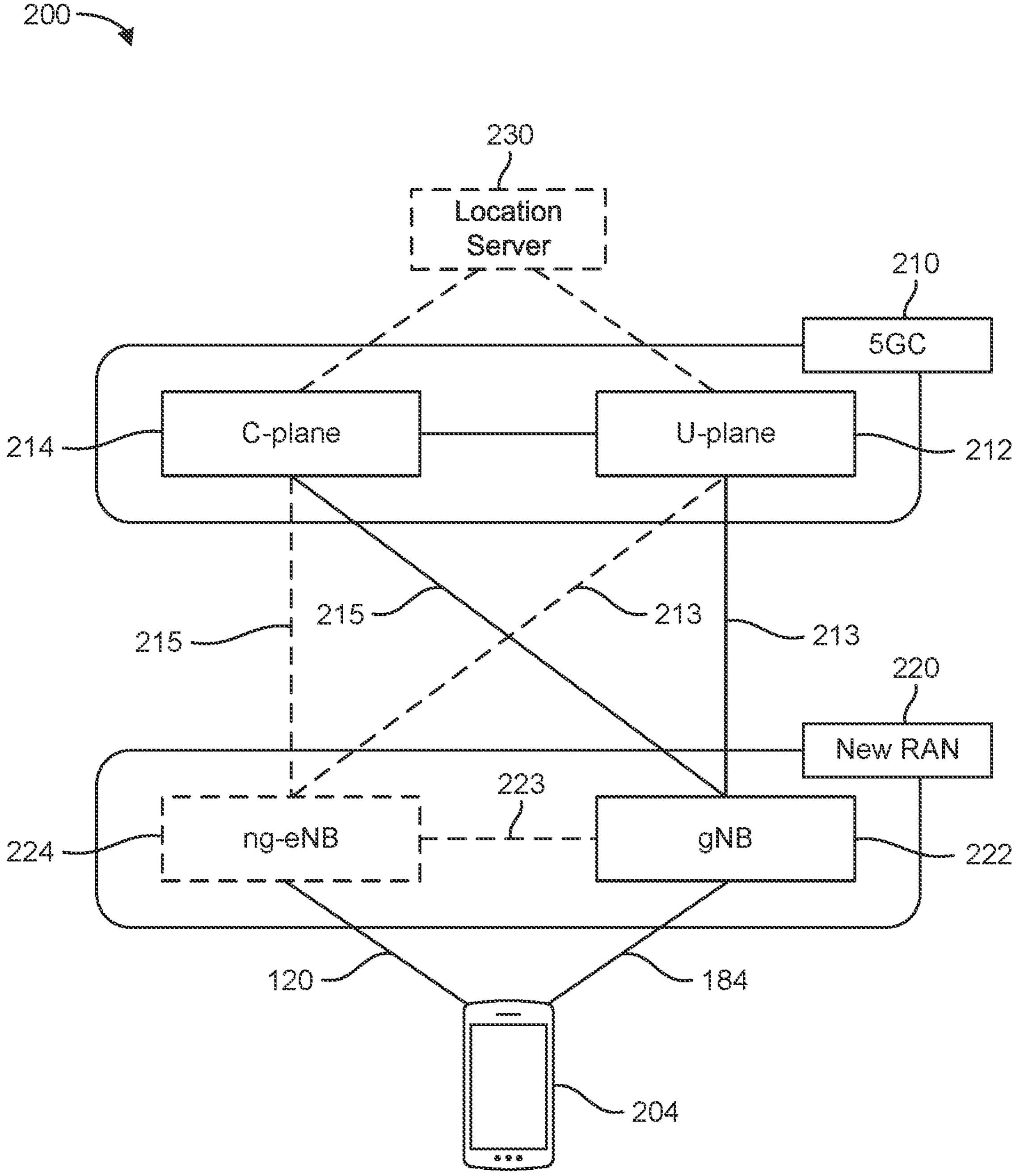
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212. (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
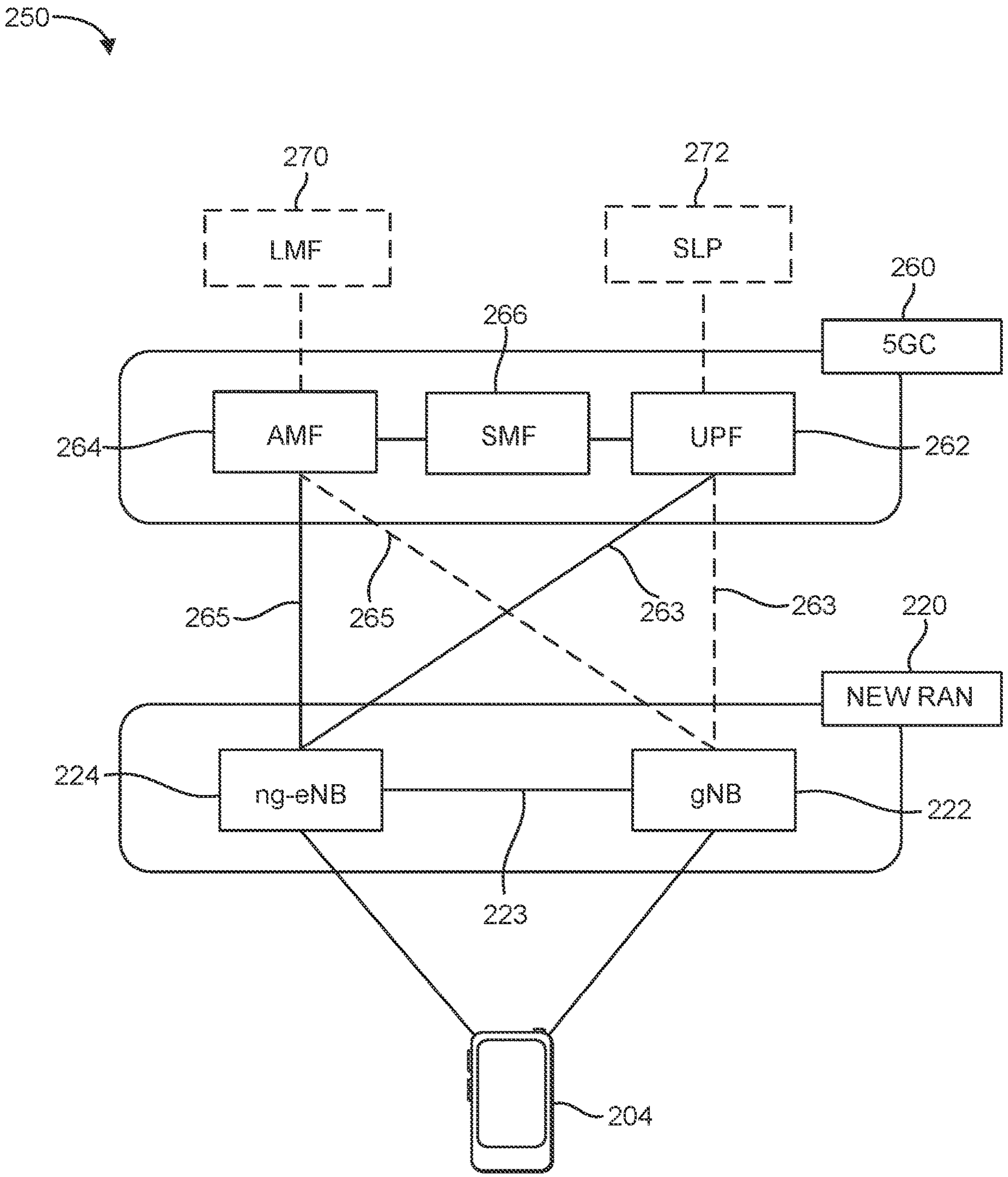

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
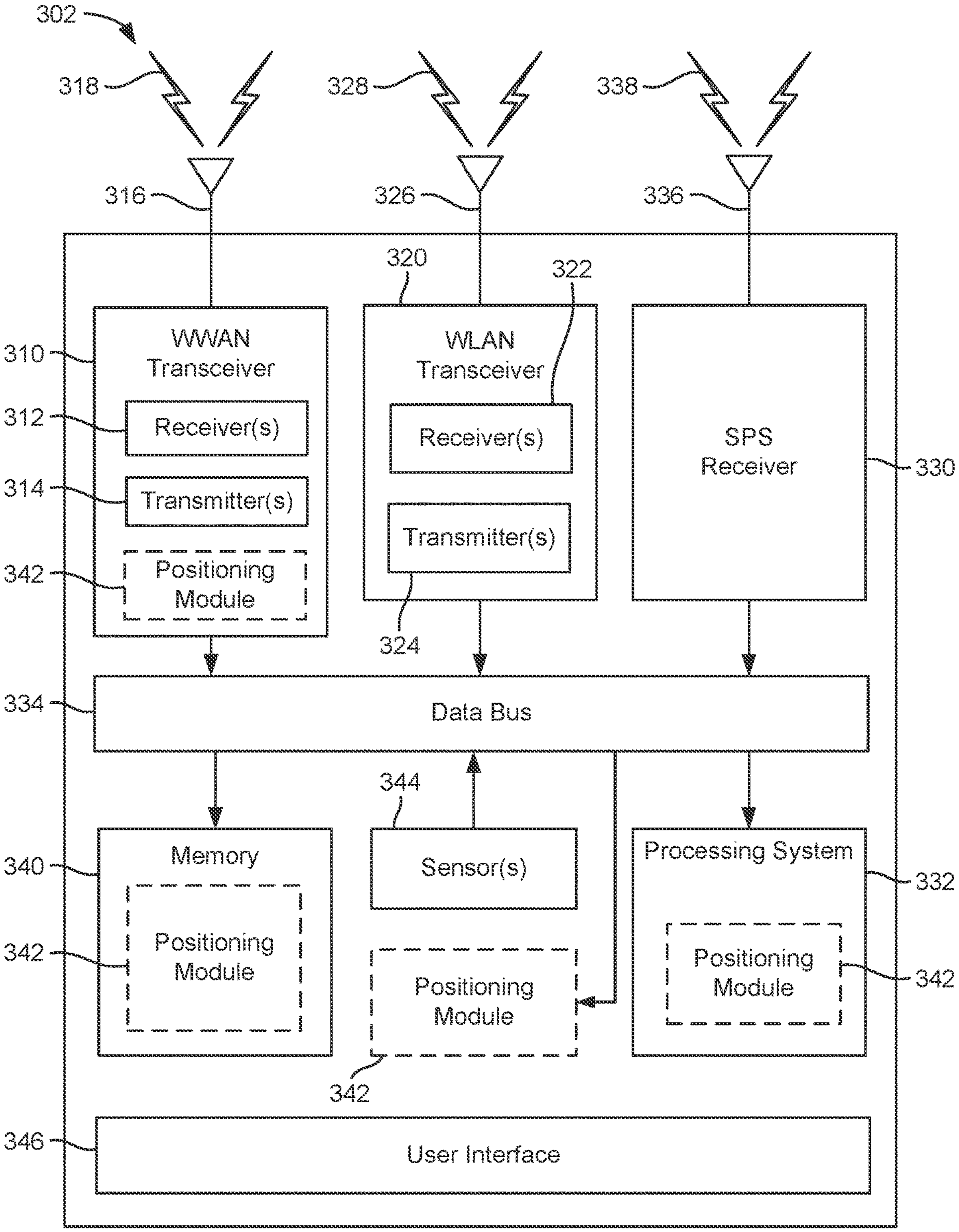
FIGS. 3A to 3C are simplified block diagrams of several sample aspects of components that may be employed in a user equipment (UE), a base station, and a network entity, respectively, and configured to support communications as taught herein.
Figure 3B:
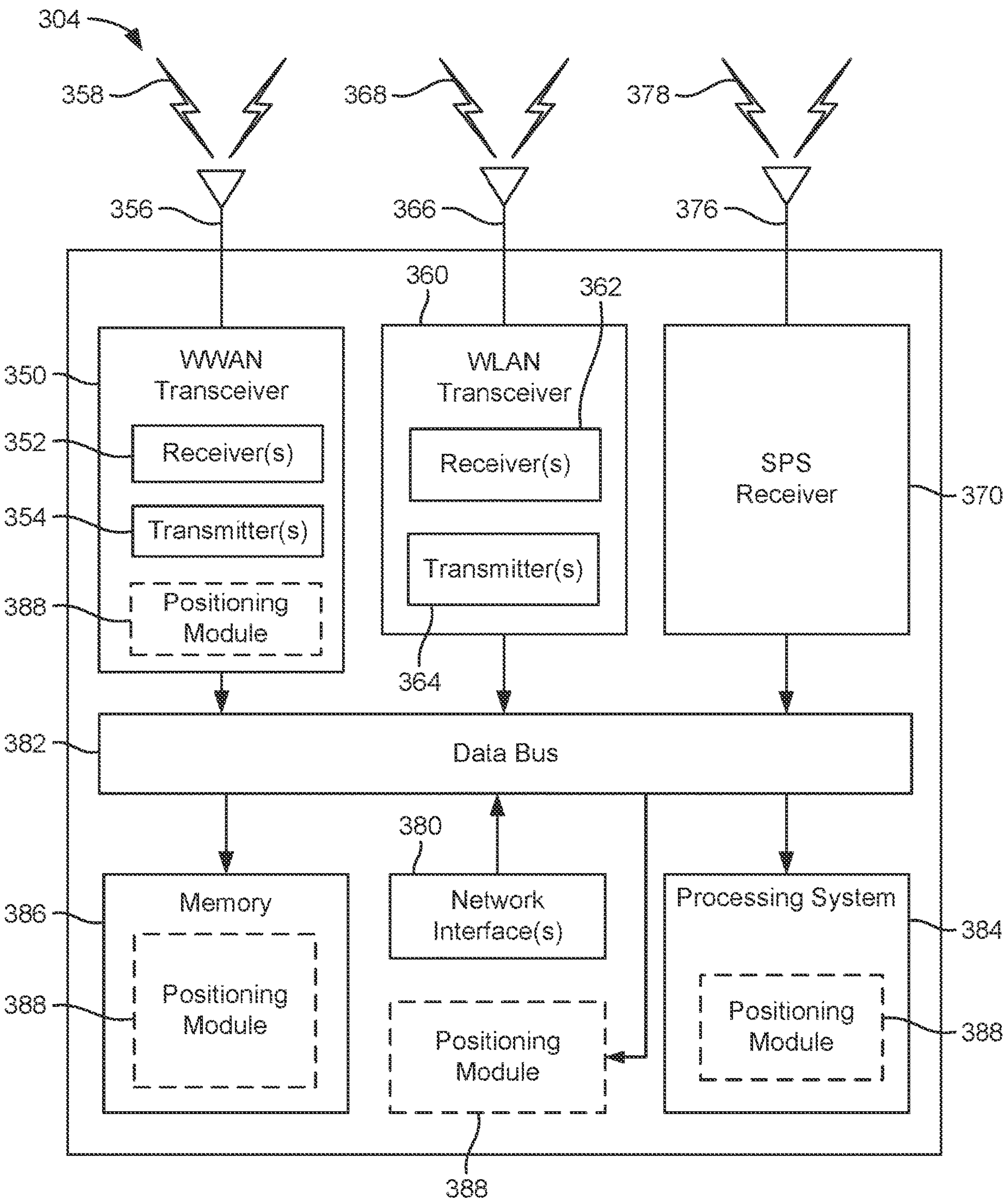
Figure 3C:
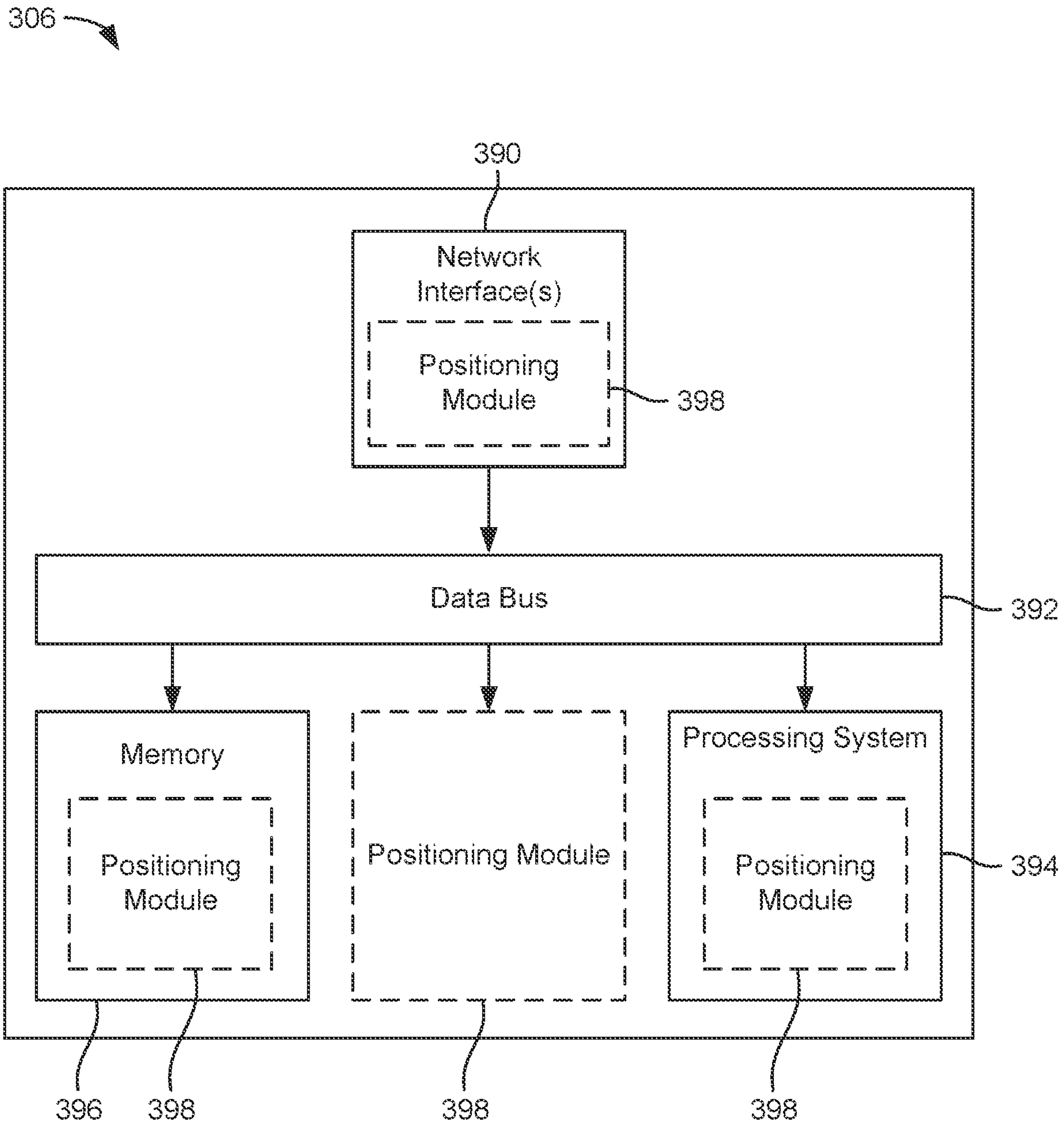

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device and which may be referred to as memories), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning modules 342, 388, and 398, respectively. The positioning modules 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning modules 342, 388, and 398 may be external to the processing systems 332, 384, and 394 (e.g., part of a modem processing system, integrated with another processing system, etc.). Alternatively, the positioning modules 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning module 342, which may be part of the WWAN transceiver 310, the memory component 340, the processing system 332, or any combination thereof, or may be a standalone component. FIG. 3B illustrates possible locations of the positioning module 388, which may be part of the WWAN transceiver 350, the memory component 386, the processing system 384, or any combination thereof, or may be a standalone component. FIG. 3C illustrates possible locations of the positioning module 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink. IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB. SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by components 310 to 346 may be implemented by processor and memory component(s) of the UE 302 (e.g., by execution of appropriate code and/or by appropriate configuration of processor components). Similarly, some or all of the functionality represented by components 350 to 388 may be implemented by processor and memory component(s) of the base station 304 (e.g., by execution of appropriate code and/or by appropriate configuration of processor components). Also, some or all of the functionality represented by components 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the positioning modules 342, 388, and 398, etc.

Various frame structures may be used to support downlink and uplink transmissions between network nodes (e.g., base stations and UEs).

Figure 4A:
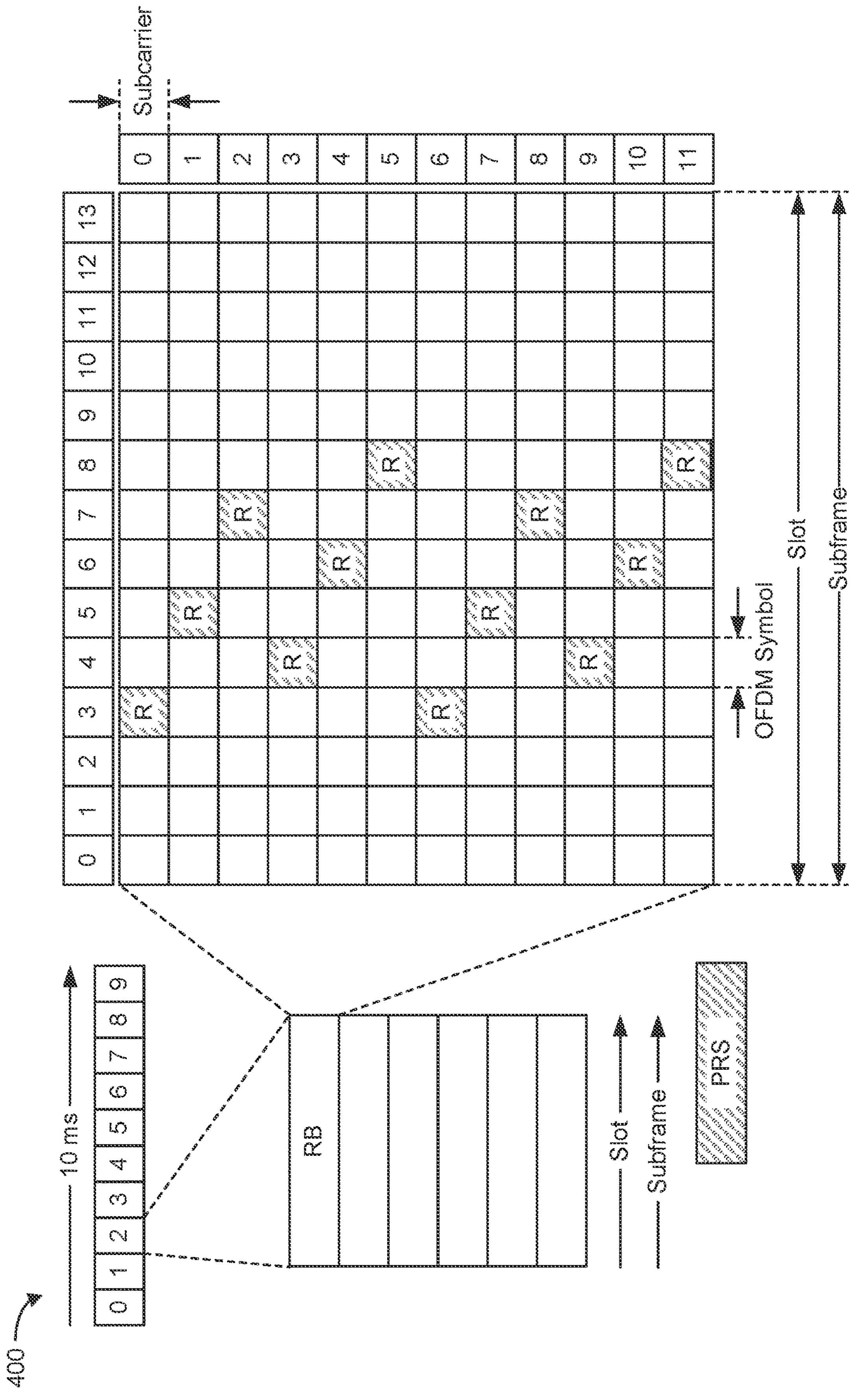
FIGS. 4A to 4D are diagrams illustrating example frame structures and channels within the frame structures, according to aspects of the disclosure.

FIG. 4A is a diagram 400 illustrating an example of a downlink frame structure, according to aspects of the disclosure.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (p), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1} 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from 2^μ*{4, 5, 8, 10, 16, 20, 32, 40, 64, 80, 160, 320, 640, 1280, 2560, 5120, 10240} slots, with μ=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion." an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifics a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is similar to the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Figure 4B:
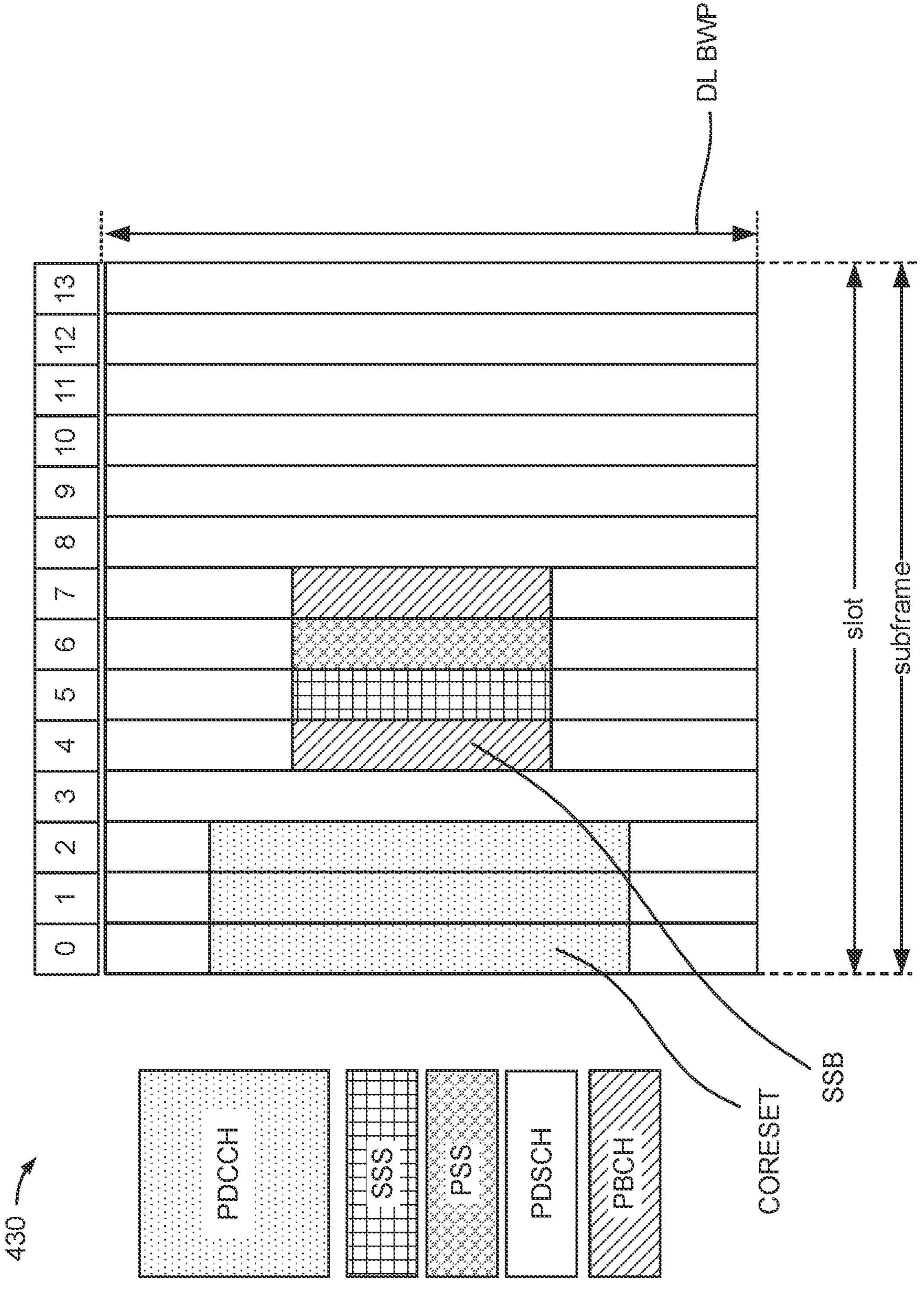

FIG. 4B is a diagram 430 illustrating an example of channels within the downlink frame structure, according to aspects of the disclosure. FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. One BWP (uplink or downlink) may be active at a given time, meaning the UE may receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 4C:
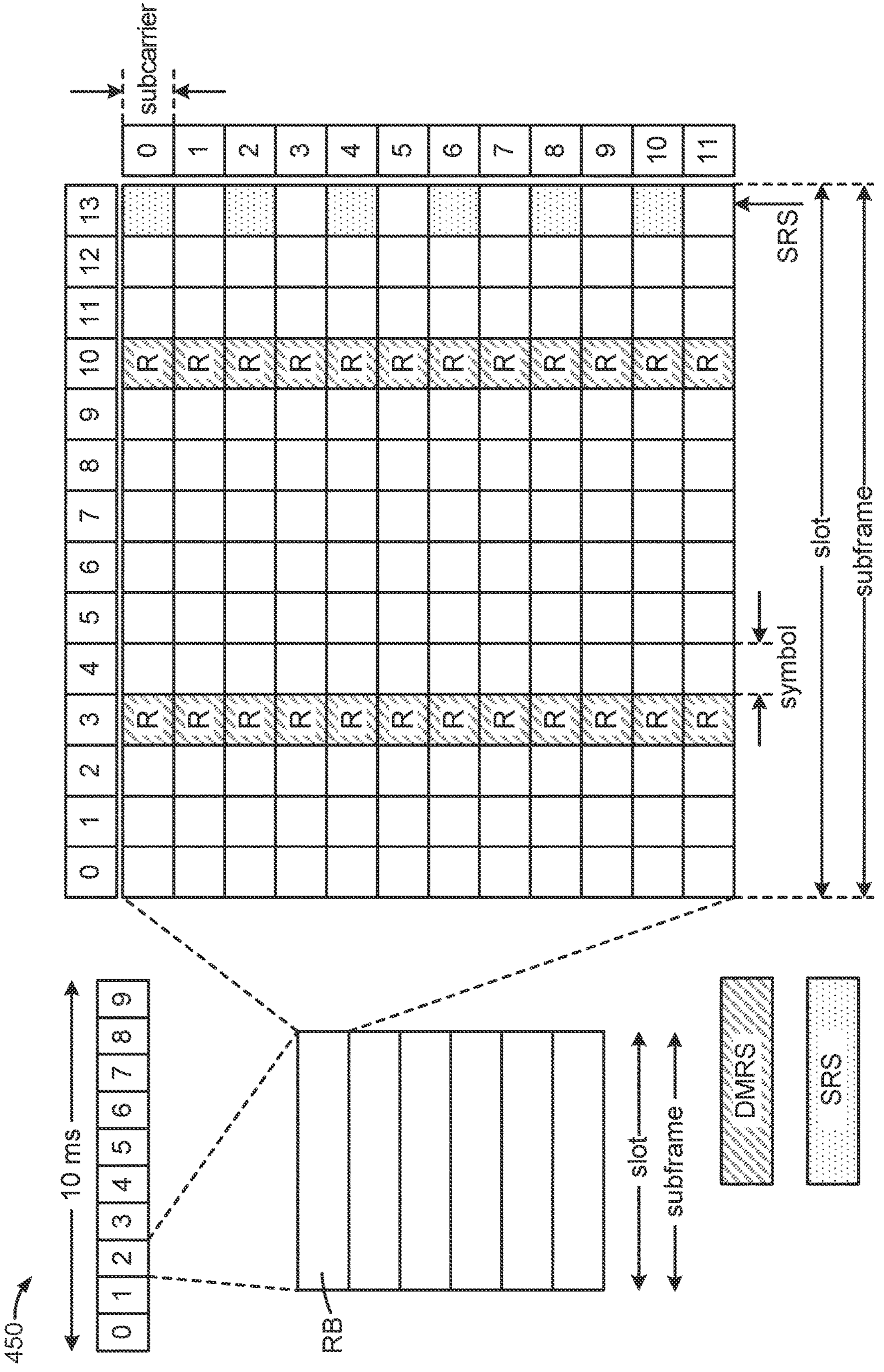

FIG. 4C is a diagram 450 illustrating an example of an uplink frame structure, according to aspects of the disclosure. As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 4-symbol comb-2: {0, 1, 0,}: 4-symbol comb-4: {0, 2, 1, 3}; 8-symbol comb-4: {0, 2, 1, 3, 0, 2, 1, 3}: 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS also can be used as uplink positioning reference signals for uplink positioning procedures, such as UL-TDOA, multi-RTT, DL-AoA, etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

Figure 4D:
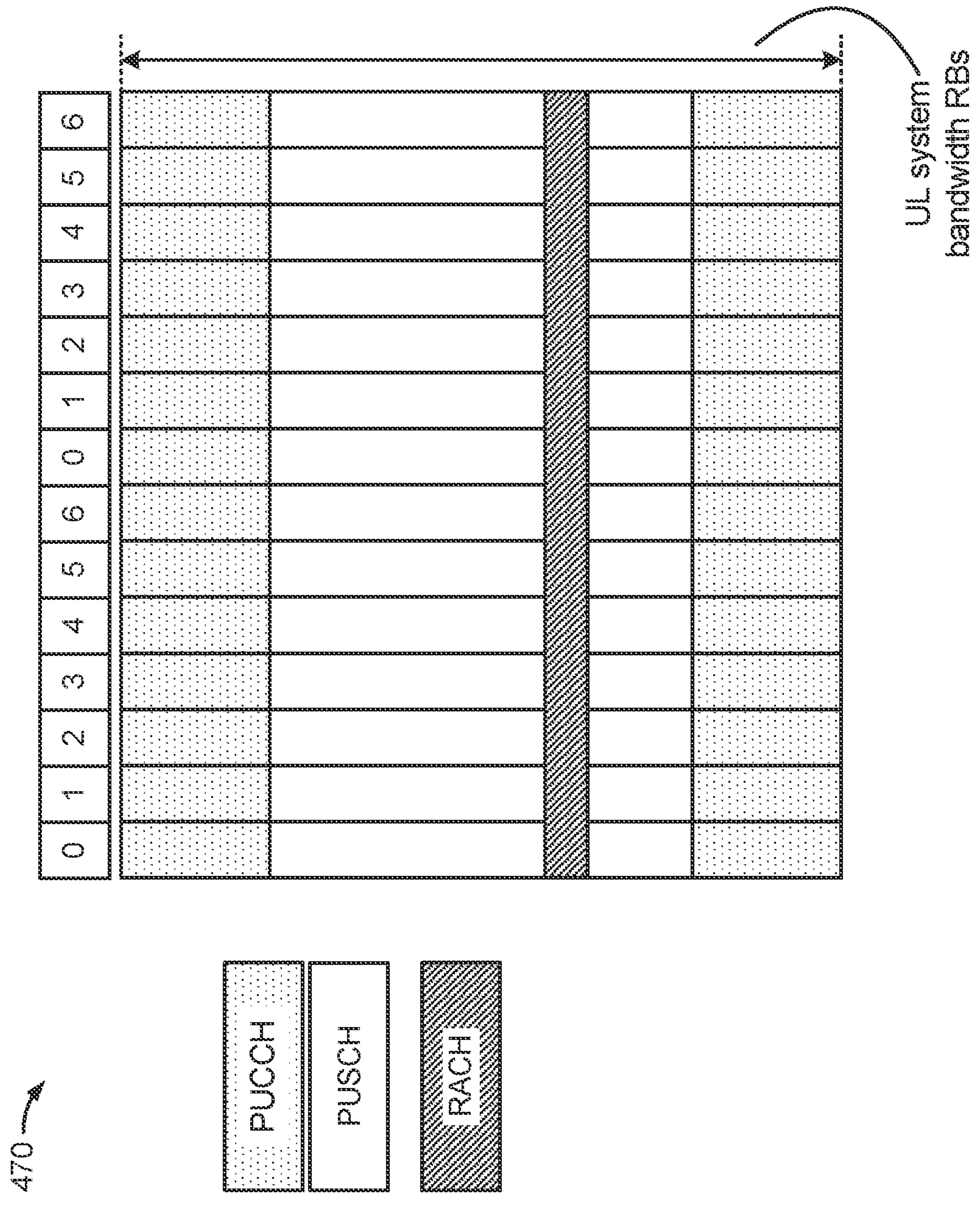

FIG. 4D is a diagram 470 illustrating an example of channels within an uplink frame structure, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Other wireless communications technologies may have different frame structures and/or different channels. Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS. CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
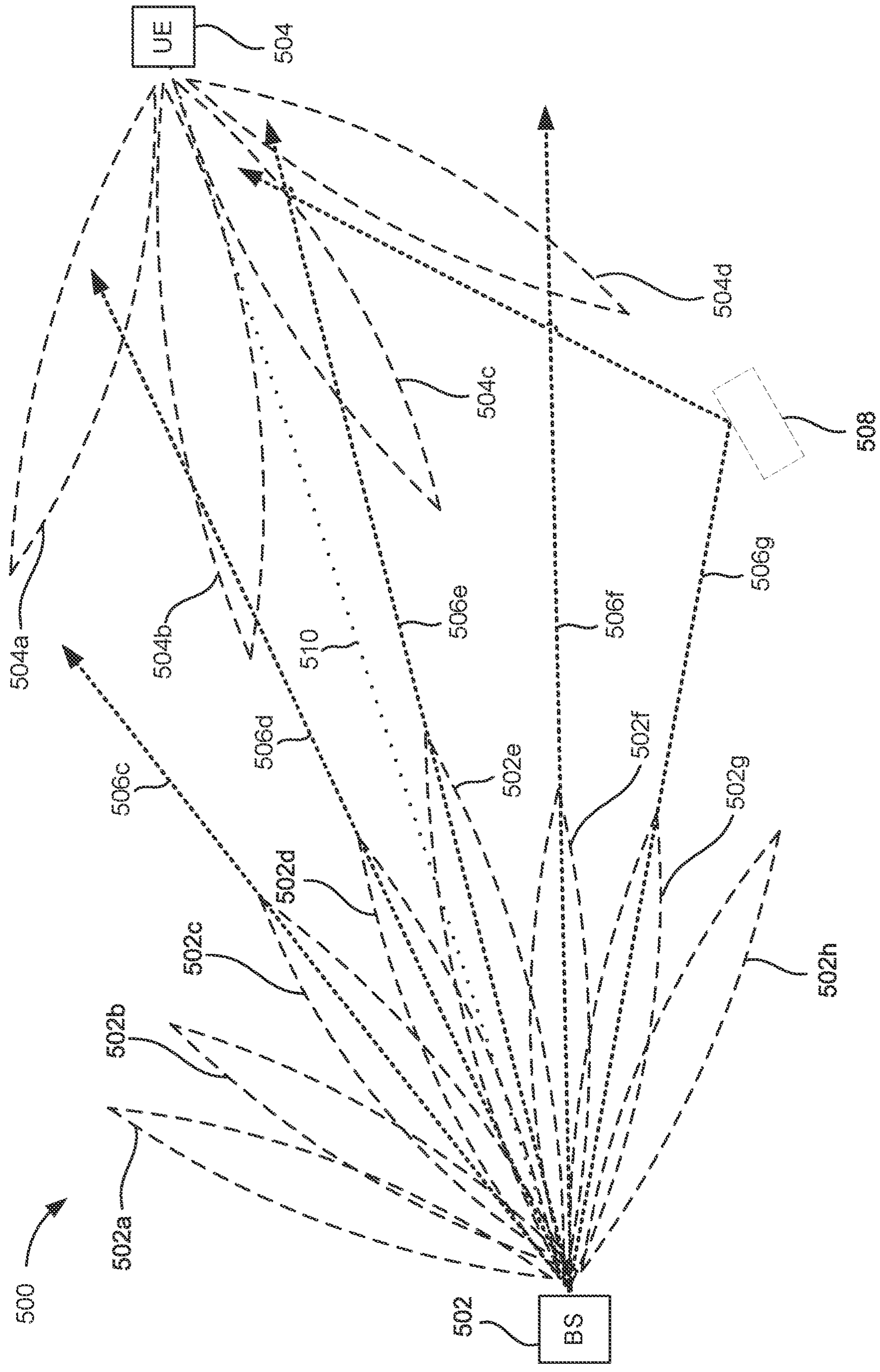
FIG. 5 is a diagram illustrating an example base station in communication with an example UE, according to aspects of the disclosure.

FIG. 5 is a diagram 500 illustrating a base station (BS) 502 (which may correspond to any of the base stations described herein) in communication with a UE 504 (which may correspond to any of the UEs described herein). Referring to FIG. 5, the base station 502 may transmit a beamformed signal to the UE 504 on one or more transmit beams 502*a*, 502*b*, 502*c*, 502*d*. 502*e*, 502*f*, 502*g*, 502*h*, each having a beam identifier that can be used by the UE 504 to identify the respective beam. Where the base station 502 is beamforming towards the UE 504 with a single array of antennas (e.g., a single TRP/cell), the base station 502 may perform a "beam sweep" by transmitting first beam 502*a*, then beam 502*b*, and so on until lastly transmitting beam 502*h*. Alternatively, the base station 502 may transmit beams 502*a*-502*h* in some pattern, such as beam 502*a*, then beam 502*h*, then beam 502*b*, then beam 502*g*, and so on. Where the base station 502 is beamforming towards the UE 504 using multiple arrays of antennas (e.g., multiple TRPs/cells), each antenna array may perform a beam sweep of a subset of the beams 502*a*-502*h*. Alternatively, each of beams 502*a*-502*h* may correspond to a single antenna or antenna array.

FIG. 5 further illustrates the paths 506*c*, 506*d*, 506*e*, 506*f*, and 506*g* followed by the beamformed signal transmitted on beams 502*c*, 502*d*, 502*e*, 502*f*, and 502*g*, respectively. Each path 506*c*, 506*d*, 506*e*, 506*f*, 506*g* may correspond to a single "multipath" or, due to the propagation characteristics of radio frequency (RF) signals through the environment, may be comprised of a plurality (a cluster) of "multipaths." Note that although the paths for beams 502*c*-502*g* are shown, this is for simplicity, and the signal transmitted on each of beams 502*a*-502*h* will follow some path. In the example shown, the paths 506*c*, 506*d*, 506*e*, and 506*f* are straight lines, while path 506*g* reflects off an obstacle 508 (e.g., a building, vehicle, terrain feature, etc.).

The UE 504 may receive the beamformed signal from the base station 502 on one or more receive beams 504*a*, 504*b*. 504*c*, 504*d*. Note that for simplicity, the beams illustrated in FIG. 5 represent either transmit beams or receive beams, depending on which of the base station 502 and the UE 504 is transmitting and which is receiving. Thus, the UE 504 may also transmit a beamformed signal to the base station 502 on one or more of the beams 504*a*-504*d*, and the base station 502 may receive the beamformed signal from the UE 504 on one or more of the beams 502*a*-502*h*.

In an aspect, the base station 502 and the UE 504 may perform beam training to align the transmit and receive beams of the base station 502 and the UE 504. For example, depending on environmental conditions and other factors, the base station 502 and the UE 504 may determine that the best transmit and receive beams are 502*d* and 504*b*, respectively, or beams 502*e* and 504*c*, respectively. The direction of the best transmit beam for the base station 502 may or may not be the same as the direction of the best receive beam, and likewise, the direction of the best receive beam for the UE 504 may or may not be the same as the direction of the best transmit beam.

To perform a DL-AoD positioning procedure, the base station 502 may transmit reference signals (e.g., PRS, CRS, TRS, CSI-RS, PSS, SSS, etc.) to the UE 504 on one or more of beams 502*a*-502*h*, with each beam having a different transmit angle. The different transmit angles of the beams 502*a*-502*h* will result in different received signal strengths (e.g., RSRP, RSRQ, SINR, etc.) at the UE 504. The received signal strength will be lower for transmit beams 502*a*-502*h* that are further from the line of sight (LOS) path 510 between the base station 502 and the UE 504 than for transmit beams 502*a*-502*h* that are closer to the LOS path 510.

In the example of FIG. 5, if the base station 502 transmits reference signals to the UE 504 on beams 502*c*, 502*d*, 502*e*, 502*f*, and 502*g*, then transmit beam 502*e* is best aligned with the LOS path 510, while transmit beams 502*c*, 502*d*, 502*f*, and 502*g* are not. As such, beam 502*e* is likely to have a higher received signal strength at the UE 504 than beams 502*c*, 502*d*, 502*f*, and 502*g*. Note that the reference signals transmitted on some beams (e.g., beams 502*c* and/or 502*f*) may not reach the UE 504, or energy reaching the UE 504 from these beams may be so low that the energy may not be detectable or at least can be ignored.

The UE 504 can report the received signal strength, and optionally, the associated measurement quality, of each measured transmit beam 502*c*-502*g* to the base station 502, or alternatively, the identity of the transmit beam having the highest received signal strength (beam 502*e* in the example of FIG. 5). Alternatively or additionally, if the UE 504 is also engaged in a round-trip-time (RTT) or time-difference of arrival (TDOA) positioning session with at least one base station 502 or a plurality of base stations 502, respectively, the UE 504 can report reception-to-transmission (Rx-Tx) or reference signal time difference (RSTD) measurements (and optionally the associated measurement qualities), respectively, to the serving base station 502 or other positioning entity. In any case, the positioning entity (e.g., the base station 502, a location server, a third-party client, UE 504, etc.) can estimate the angle from the base station 502 to the UE 504 as the AoD of the transmit beam having the highest received signal strength (and strongest channel impulse response and/or earliest ToA if reported) at the UE 504, here, transmit beam 502*e*.

Figure 6:
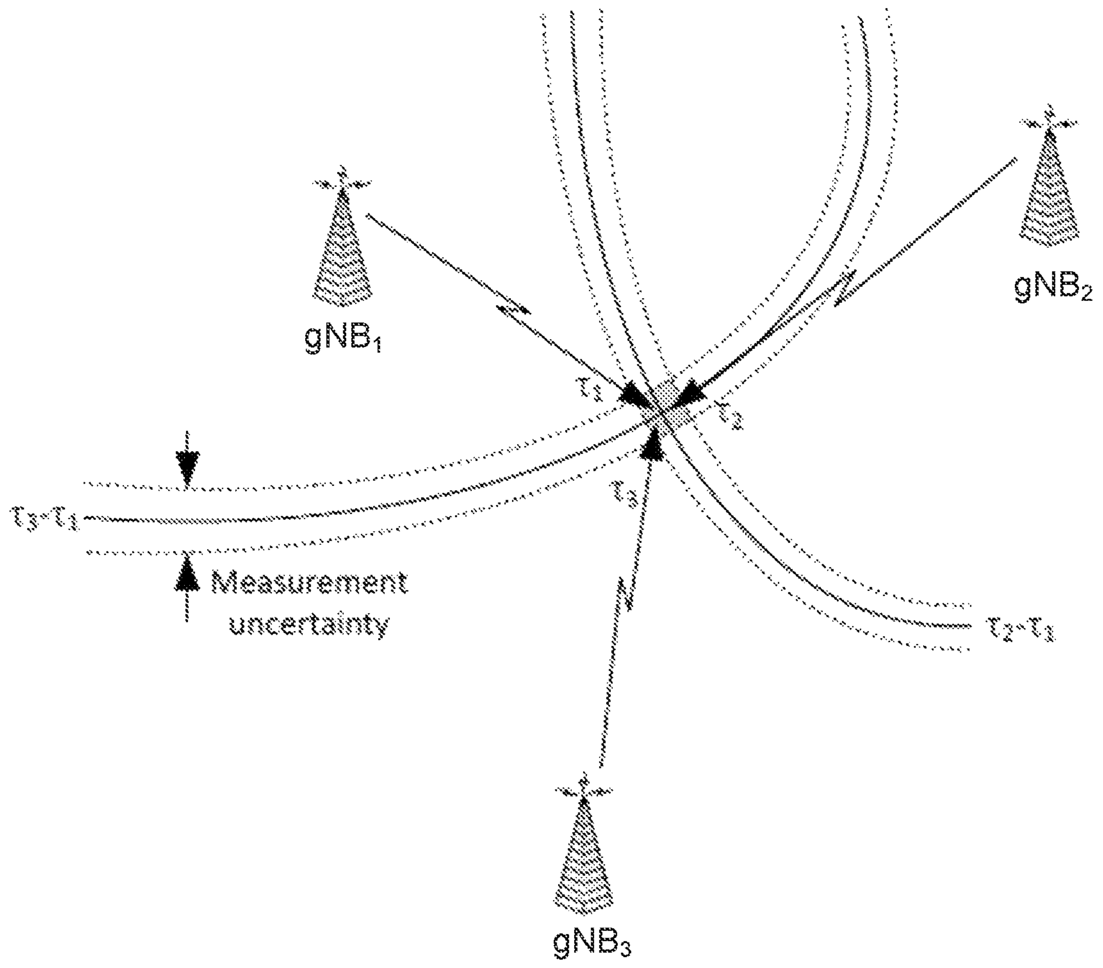
FIG. 6 illustrates an example of conventional DL time difference of arrival (TDoA) based positioning.

FIG. 6 illustrates an example of conventional DL time difference of arrival (TDoA) based positioning. In DL-TDoA, the difference in ToA between synchronized cells, e.g., gNB1, gNB2, and gNB3 in FIG. 6, provides a distance estimate along hyperbolas. Multiple TDoA measurements are used for triangulation. e.g., four or more cells. Network synchronization error among the gNBs is the main obstacle to high precision positioning. The potential timing errors $\tau\mathbf{1}$, $\tau\mathbf{2}$, and $\tau\mathbf{3}$ create a measurement uncertainty along each hyperbola.

Figure 7:
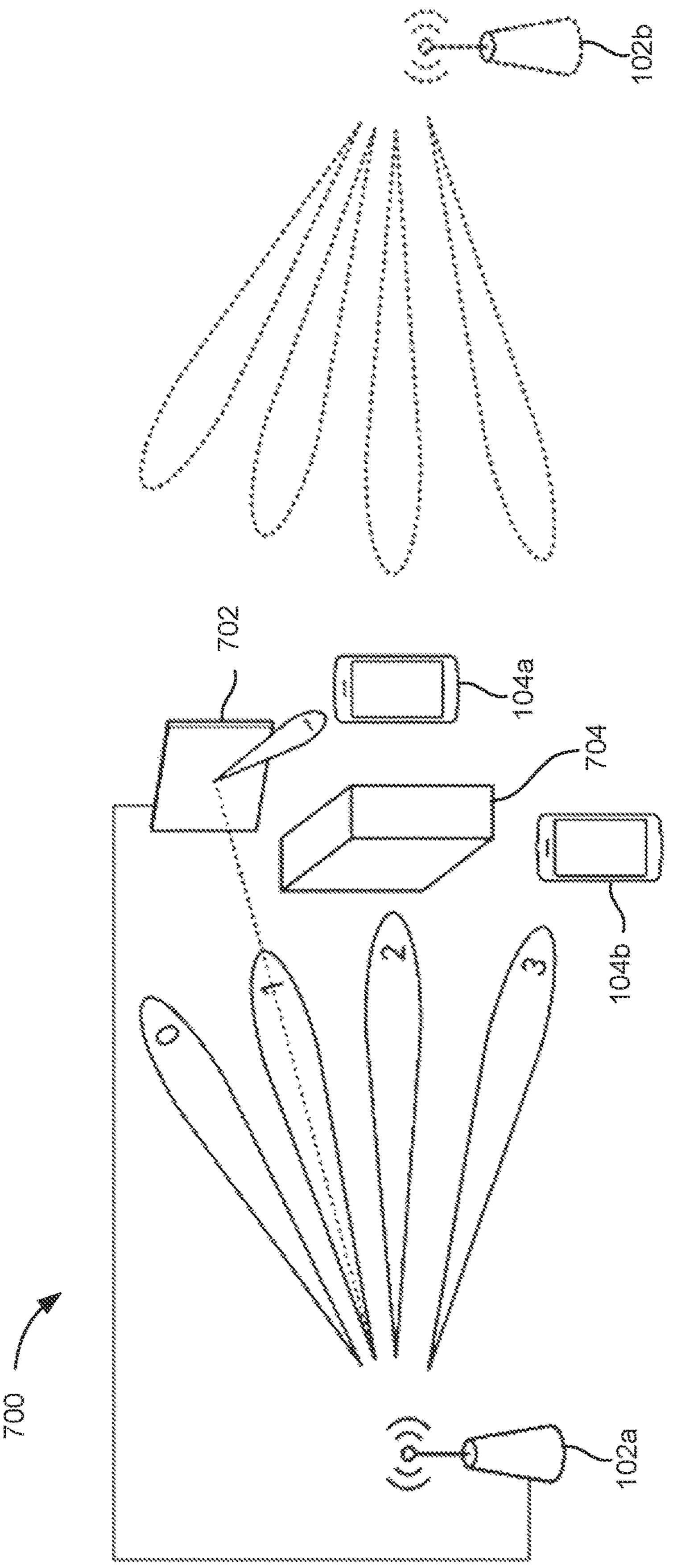
FIG. 7 illustrates a system for wireless communication using a reconfigurable intelligent surface (RIS) according to some aspects.

FIG. 7 illustrates a system 700 for wireless communication using a reconfigurable intelligent surface (RIS) 702 according to some aspects. An RIS is an artificial structure with engineered electromagnetic (EM) properties, which can collect wireless signals from a transmitter and passively beamform them towards a desired receiver. An RIS can be configured to reflect an impinging wave to a desired direction. In the example illustrated in FIG. 7, a first BS 102*a* controls the RIS 702 but a second BS 102*b* does not control the RIS 702. The enhanced functionality of the system 700 can provide technical benefits in a number of scenarios.

For example, in FIG. 7, the first BS 102*a* is attempting to communicate with a first UE 104*a* that is behind an obstacle 704 (e.g., a building, hill, or other obstacle) and thus cannot receive what would otherwise been a LOS beam from the first BS 102*a*, i.e., transmit beam 2. In this scenario, the first BS 102*a* may instead use transmit beam 1 to direct a signal to the RIS 702, which the first BS 102*a* configures to reflect the incoming transmit beam 1 towards the first UE 104*a* and around the obstacle 704. It should be noted that the first BS 102*a* may configure the RIS 702 for the UE's use in UL, e.g., such that the first UE 104*a* can bounce an UL signal to the first BS 102*a* using the RIS 702 and thus get around the obstacle 704. The first BS 102*a* and the second BS 102*b* may communicate with a second UE 104*b* via LOS beams.

In another scenario, the first BS 102*a* may be aware that an obstacle, such as obstacle 704 in FIG. 7, may create a dead zone, e.g., a geographic area in which the signal from BS 102*a* is attenuated, making the signal difficult to detect by a UE within that dead zone. In this scenario, the BS 102*a* may bounce a signal off of the RIS 702 into the dead zone in order to provide coverage to devices which may be there, including devices about which the BS 102*a* is not currently aware.

Yet another scenario in which system 700 provides a technical advantage is one involving a low-tier (e.g., low-power, low-bandwidth, low-antenna-count, low baseband processing capability) UE, such as a "NR light" or "NR RedCap" UE, which may not have the capability to hear or detect a PRS transmitted from a non-serving gNB, especially for gNBs that are far from the UE. Likewise, an SRS measurement by a non-serving gNB of an SRS from a low-tier UE may be poor. The same problems may be true for UEs that are not low-tier UEs, under certain circumstances. For whatever reason, when a UE cannot detect a sufficient number of positioning signals from different TRPs, the use of the RIS 702 can provide one or more additional positioning signals from a single TRP. When multiple positioning signals are provided by the same TRP, the problem of network synchronization errors between TRPs becomes moot, and that obstacle to high-precision positioning is avoided. An example of this specific scenario is shown in FIG. 8.

Figure 8:
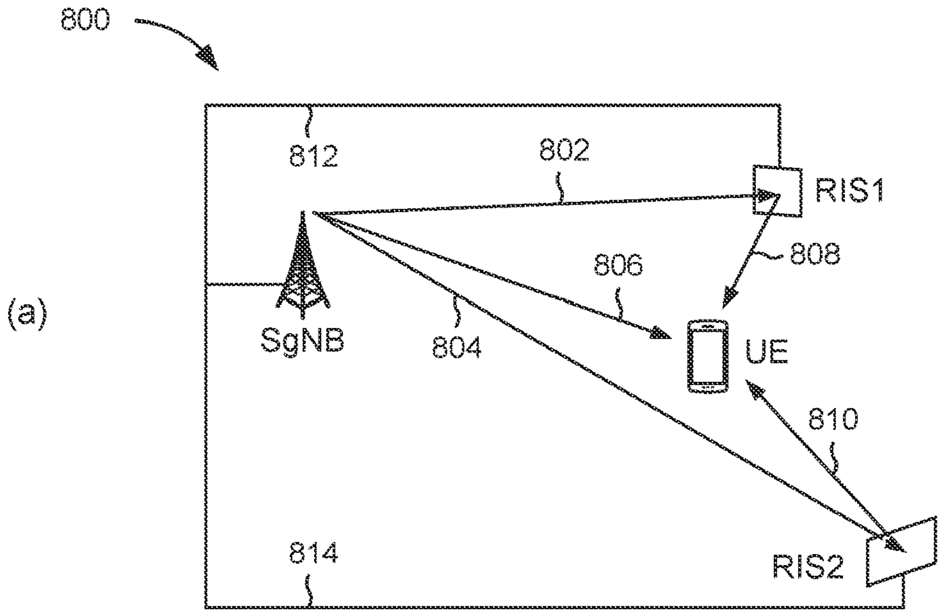
FIG. 8 illustrates a system for RIS-aided RSTD measurement according to some aspects.
Figure 8:
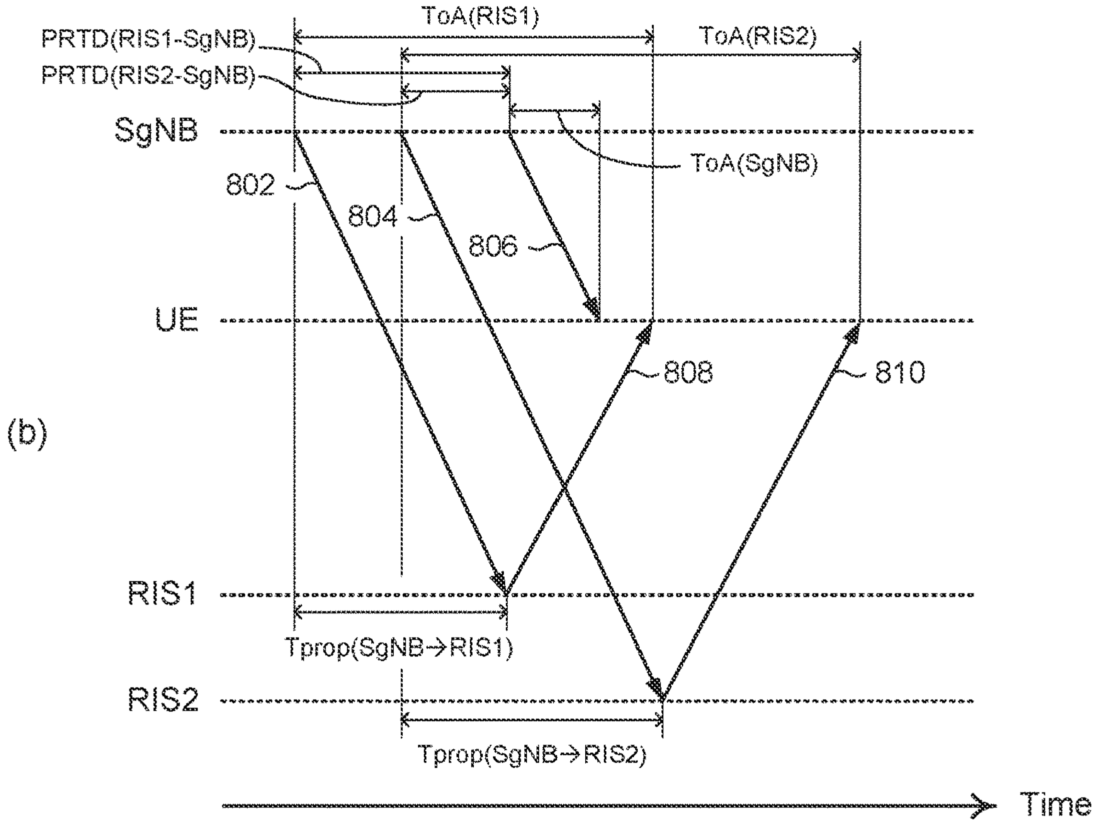

FIG. 8 illustrates a system 800 for RIS-aided RSTD measurement according to some aspects. The top portion of FIG. 8 shows the geographical positions of the entities involved in an example scenario and the bottom portion of FIG. 8 illustrates the timing of the signal transmissions and reflections in this example scenario.

In FIG. 8, a serving gNB (SgNB) or other type of base station sends a set of positioning reference signals to a target UE. A first PRS 802 is directed towards a first RIS (RIS1), a second PRS 804 is directed towards a second RIS (RIS2), and a third PRS 806 is directed towards the target UE. In the example illustrated in FIG. 8, RIS1 is closer than RIS2 is to the UE. Referring now to the bottom portion of FIG. 8, the third PRS 806 arrives at the UE first, at time ToA(SgNB). The first PRS 802 arrives at RIS1 at time Tprop(SgNB-RIS1), and RIS1 transmits a reflected PRS signal 808, which arrives at the UE at time ToA(RIS1). The second PRS 804 arrives at RIS2 at time Tprop(SgNB-RIS2), and RIS2 transmits a reflected PRS signal 810, which arrives at the UE at time ToA(RIS2). The UE measures the times of arrival (Rx) of each of PRS signal 806, PRS signal 808, and PRS signal 810. The UE is provided with the PRS real time difference (PRTD) between a pair of PRS transmissions.

RSTD is the difference in the time that it takes one reference signal to reach the UE and the time that it takes another reference signal to reach the UE. Thus, RSTD is the difference between the ToA of one reference and the ToA of another reference.

In the example shown in FIG. 8, the UE can calculate a value for ToA for each of the third PRS 806, the reflected PRS signal 808, and the reflected PRS signal 810, namely, ToA(SgNB), ToA(RIS1), and ToA(RIS2), as well as RSTD values for each pair. For example, the UE may compute the RSTD between the SgNB and RIS1 using the following equation:

$$\begin{aligned} RSTD(SgNB, RIS1) &= ToA(SgNB) - ToA(RIS1) \\ &= (Rx(SgNB) - Tx(SgNB)) - ((Rx(RIS1) - Tx(RIS1)) \\ &= Rx(SgNB) - Rx(RIS1) - PRTD + Tprop(SgNB - RIS1) \end{aligned}$$

where

Rx(SgNB) is the time that the UE receives PRS 806,

Rx(RIS1) is the time that the UE receives PRS 808,

PRTD is the transmission time offset between PRS 806 and PRS 808, and Tprop(SgNB-RIS1) is the time it takes PRS 802 to reach RIS1.

Note that the transmit time for each PRS is not needed. In this example, the equation will calculate the difference between the time that PRS 806 takes to get from the SgNB to the UE and the time that PRS 808 takes to get from RIS1 to the UE.

For UE-assisted positioning, the UE may report RSTD without including PRTD, and the network will calculate the UE's position based on PRTD data known to the network but not known by the UE. In order for the UE to perform UE-based positioning (as opposed to UE-assisted positioning), however, the computation of RSTD requires knowledge of the value of PRTD. In some aspects, the value of PRTD is signaled to the UE via assistance data provided by a location server. In some aspects, the UE may use the received PRTD value as an "expected RSTD", which can inform the UE where it should search for a PRS. In some aspects, the UE may be provided with an "PRTD uncertainty" value which the UE can use to aid its PRS search window selection. In some aspects, Tprop(SgNB-RIS1 may be estimated through radio access technology (RAT) techniques (e.g., NR-based positioning) or RAT-independent methods (e.g., high precision PRS or other hybrid positioning methods).

In some aspects, the UE may know the geographic locations of RIS1 and RIS2, in which case the UE may estimate its own position via triangulation techniques using the values of RSTD for pair of SgNB, RIS1, and RIS2.

In the example illustrated in FIG. 8, the SgNB may have configured RIS1 to reflect the incoming PRS signal 802 in an intended direction, e.g., via a link 812 between the SgNB and RIS1. In some circumstances, RIS1 may not need to be configured for this purpose, e.g., because RIS1 was already suitably configured to reflect an incoming PRS signal in the intended direction, because RIS1 is not configurable by the SgNB but provides a suitable reflected signal anyway, or because RIS1 was configured by an entity other than the SgNB. The same may be true of RIS2, e.g., via a link 814 between the SgNB and RIS2. The intended direction of the reflected signal may be chosen for various reasons, such as to get a signal to a target UE in a known location, to get a signal into a target area (e.g., where the LOS signal from the SgNB is blocked by a known obstacle) whether a target UE is in that area or not, other reasons, or some combination thereof. The SgNB may not know the location of a target UE, and may not know whether or not any UEs are in the target area. The SgNB relies upon the UE to measure the RIS reflected signals.

The signal that a RIS receives from a serving base station may be omnidirectional or beamformed, and the reflected beam produced by the RIS may be similarly omnidirectional or beamformed in nature. When a RIS receives a signal from the serving base station, the RIS may produce a reflected signal that is wider, narrower, or the same width in transmission profile. For example, the SgNB may transmit a narrowly beam-formed PRS to RIS1, and RIS1 may reflect a more widely dispersed signal towards the UE, such as in situations where the location of the UE is not exactly known. Likewise, RIS1 may reflect a more focused signal towards the target UE, such as where the location of the UE has been estimated with some confidence and a narrower beam would provide a better signal to noise ratio towards the target UE.

In some aspects, the SgNB may dynamically control the behavior of RISes under its control during the process of transmitting multiple PRS signals. In the scenario illustrated in FIG. 8, for example, the SgNB may control RIS2 so that it is disabled while the SgNB is transmitting PRS signal 802 towards RIS1, control RIS1 so that it is disabled while the SgNB is transmitting PRS signal 804 towards RIS2, and control RIS1 and RIS2 so that both are disabled while the SgNB is transmitting PRS signal 806 directly towards the UE. In this manner, the SgNB can reduce or eliminate the likelihood that the target UE will receive a reflection from a RIS when a reflection is not desired, e.g., so that PRS signal 806 does not reflect off of RIS1 or RIS2 and reach the target UE. It is noted that the order of transmission of the PRS signals is illustrative and not limiting: for example, in some aspects, the SgNB may first transmit a PRS towards the target UE, towards RIS2, then towards RIS1, or in any other order. It is also noted that although FIG. 8 illustrates an example using two RISes, the same concepts may be applied for any number of RISes greater than zero.

In an embodiment, RIS1 and RIS2 may be implemented with different materials and hardware and thus may have different operational capabilities. For example, the different capabilities may impact beam accuracy and/or speed of phase shift control of beams reflected from a RIS. A location server, such as the LMF 270, may adapt PRS procedures and/or PRS configurations based on the capabilities of the RISes in a network.

Figure 9A:
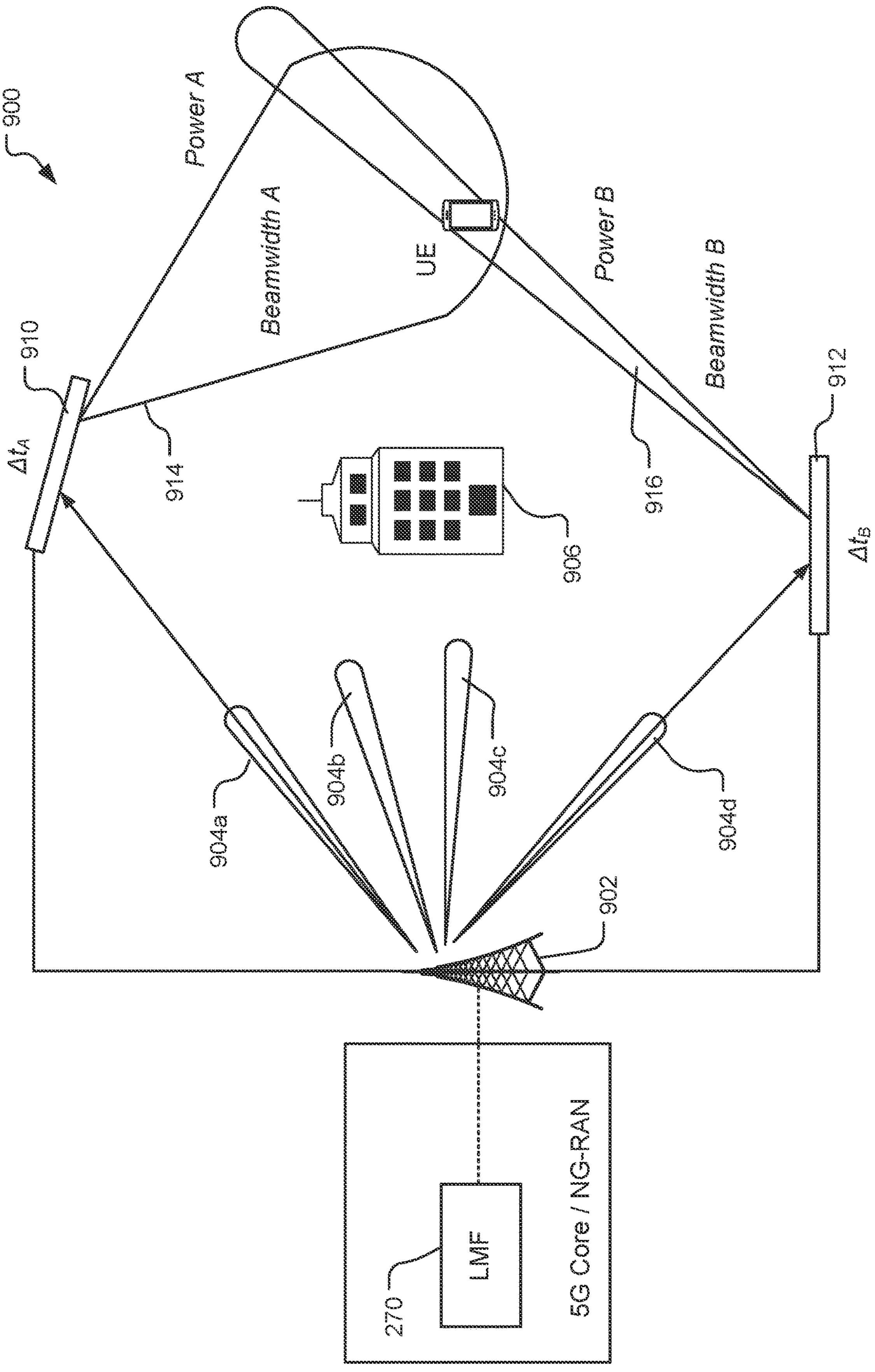
FIGS. 9A and 9B are diagrams of example Positioning Reference Signal (PRS) RIS beam capabilities.

Referring to FIG. 9A, a diagram 900 of example PRS RIS beam capabilities is shown. The diagram 900 includes a base station 902, such as the SgNB described in FIG. 8, a first RIS 910, a second RIS 912, and a UE. The base station 902 may be an element in the communication system 100 and configured to communicate with a network server such as the LMF 270. The base station 902 may be based on other RATs capable of utilizing RIS in a network. In an example, the base station 902 is configured to generate a first beam 904*a*, a second beam 904*b*, a third beam 904*c* and a fourth beam 904*d*. The first beam 904*a* is directed toward the first RIS 910 and the fourth beam 904*d* is directed towards the second RIS 912. A building 906 (or other obstacle) may be blocking the second beam 904*b* and the third beam 904*c* and thus causing the signals to be attenuated at the UE. The first RIS 910 and the second RIS 912 have different configurations and different capabilities. The capabilities depicted in FIG. 9A are examples, and not limitations, as other RIS configurations may have different capabilities. For example, the RISes 910, 912 may each have different phase control capabilities, including different accuracy and speed parameters. Each RIS 910, 912 may have different maximum phase shift errors within a time duration. Each RIS 910, 912 may have different phase shift speeds ($\Delta t_A$, $\Delta t_B$) indicating the time required to complete a phase shift switch (e.g., milliseconds, symbols, slots). Thus, the time required for the first RIS 910 to be configured to reflect a first reflected beam 914 (i.e., $\Delta t_A$) may be different from the time required for the second RIS 912 to be configured to reflect a second reflected beam 916 (i.e., $\Delta t_B$). The beam shapes of the respective reflected beams 914, 916 may be different. For example, the first reflected beam 914 may have a first 3 dB beamwidth (e.g., beamwidth A) and the second reflected beam 916 may have a second 3 dB beamwidth (e.g., beamwidth B). The power loss or gain of beams reflected from the RISes 910, 912 may also be different. For example, the first reflected beam 914 may have a first power (e.g., power A) and the second reflected beam 916 may have a second power gain (e.g., power B). Other capabilities and beam parameters may also be categorized for different RIS capabilities.

In an embodiment, a network server (e.g., the LMF 270) may be configured to provide the RIS capabilities to other network stations such as the base stations and UEs to enable the RISes to be used for positioning applications. In an embodiment, based on each of the RISes' capabilities, the base station 902 (or other network entity) may be configured to adapt the configurations of PRSs transmitted from the base station 902 (e.g., using the first beam 904*a* and the fourth beam 904*d*). For example, the accuracy of the phase shift control and/or beam shape of signals reflected from a RIS may be used to determine a number of PRS beams to be configured for a PRS beam sweep. The speed of the phase shift control may be utilized to select a "PRS-ResourceTimeGap" value such that the PRS-ResourceTimeGap≥x, where 'x' is based on the different phase shift speeds ($\Delta t_A$, $\Delta t_B$), and may be translated in the unit of slots based on the "PRS-ResourceTimeGap" information element as defined in existing industry standards. Other adaptations of PRS configuration elements may also be used based on the capabilities of the RISes.

Figure 9B:
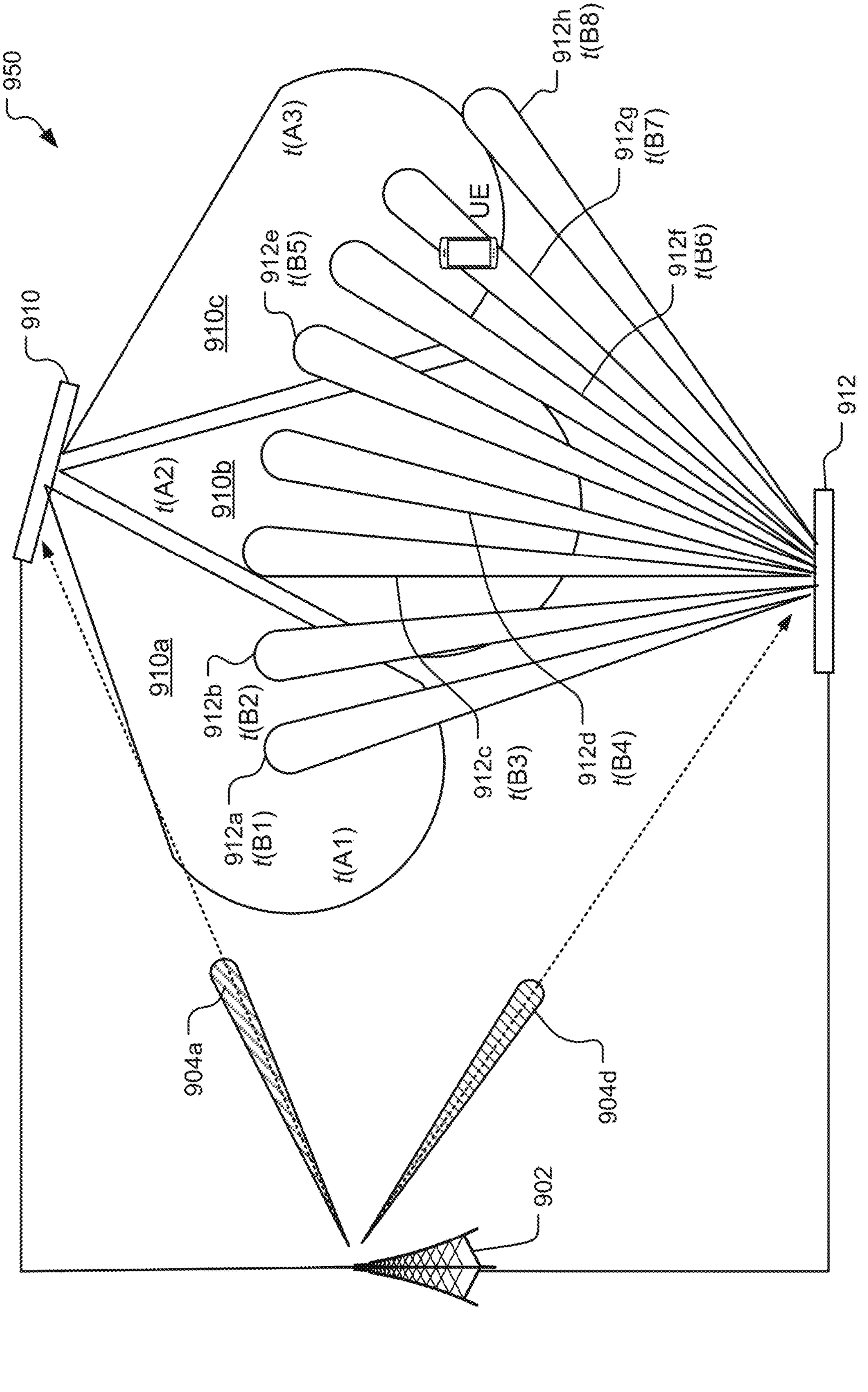

Referring to FIG. 9B, with further reference to FIG. 9A, a diagram 950 of example PRS RIS beam capabilities is shown. The diagram 950 includes the base station 902, the first RIS 910, the second RIS 912 and the UE. The base station 902 is configured to provide beam formed PRS signals such as the first beam 904*a* and the fourth beam 904*d* (other beams may also be used but are not shown in the diagram 950). The first RIS 910 may be capable of reflecting three different reflected beams 910*a-c* based on the first beam 904*a*, and the second RIS 912 may be capable of reflecting eight different reflected beams 912*a-h* based on the fourth beam 904*d*. The number, beam shapes, and beam directions are examples and not limitations. In operation, the reflected beams 910*a-c*, 912*a-h* may be based on the slot times for the respective PRS signals transmitted by the base station 902. For example, a beam sweeping process may be configured such that each of the reflected beams 910*a-c* is utilized every third transmission of the first beam 904*a*, and each of the reflected beams 912*a-h* is utilized every eighth transmission of the fourth beam 904*d*. Each of the reflected beams 910*a-c*, 912*a-h* may have respective timing values (i.e., t(A1)-t(A3), t(B1)-t(B8)) to indicate the speed of the phase shift control for the respective reflected beams. Phase shift accuracy may also be associated with a reflected beam (or the RIS). The periods and transmission times of the first and fourth beams 904*a*, 904*d*, and the corresponding reflected beams 910*a-c*, 912*a-h* may be varied, and the various beam and timing configurations may be provided to the UE via positioning assistance data. In an example, the LMF 270 may be configured to adapt the number and timing of PRS beams for a beam sweep based on the number of reflected beams 910*a-c*, 912*a-h* and the respective timing values.

In an embodiment, a UE may be configured to utilize the reflected beams 910*a-c*, 912*a-h* a corresponding downlink (DL) Angle-of-Departure (AoD) value in positioning computations. For example, the phase shift accuracy and beam shape may be provided to the UE in positioning assistance data to enable the UE to utilize the AoD information. RIS beam shape information, such as 3 dB beam width, may be used to enable the UE to compute an AoD estimate, for example, through interpolation across a signal measurement. A phase shift accuracy value may be utilized as an uncertainty value associated with the RIS beam width. In an embodiment, the assistance data may include the speed of phase shift control information to enable power saving processes on a UE. For example, the UE may be configured to enter a low power mode (e.g., sleep mode) during the phase switch gap. In an example, the UE may be configured to shut down an RF chain during the RIS phase shift gap.

The assistance data may include power information indicating the expected power loss or gain associated with a RIS reflection. The power information may be utilized by the UE for uplink (UL) SRS power control. For example, if a DL reference signal is reflected by a RIS, the power loss or gain associated with the RIS may be ignored in the SRS power control. Conversely, if a DL reference signal is not reflected by a RIS, and the SRS is reflected by the RIS, the additional power loss or gain information associated with the RIS may be utilized as an open loop power control of SRS transmitted by the UE. That is, the UE may be configured to compare the DL path loss without RIS reflection and gain or loss due to RIS reflection in the SRS transmission. The beam information associated with the capabilities of RISes in a network may be provided to the UE in the assistance data.

Figure 10:
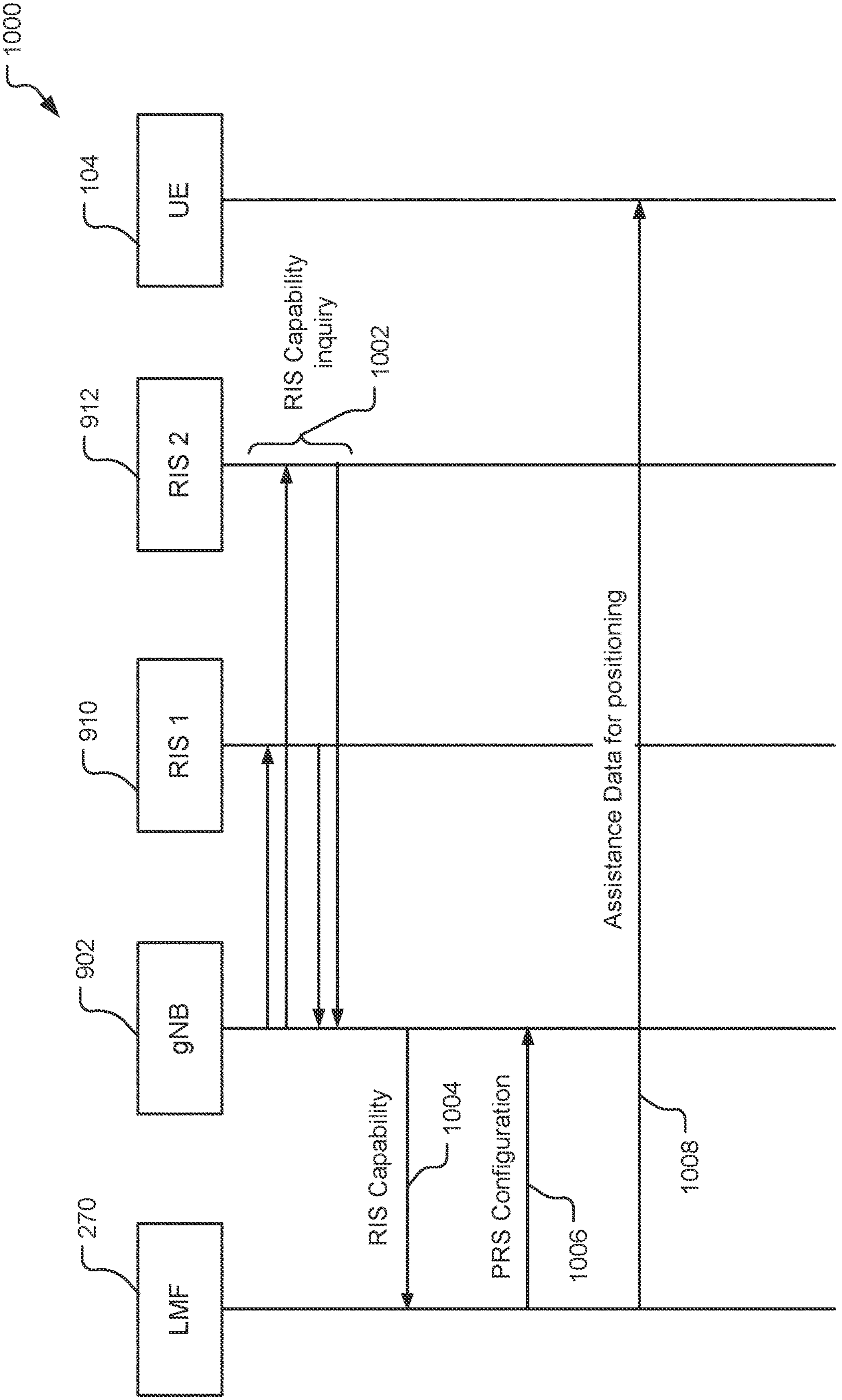
FIG. 10 is an example message flow diagram for operational adaptation of RIS based positioning.

Referring to FIG. 10, an example message flow diagram 1000 for operational adaptation of RIS based positioning is shown. The messages in the message flow diagram 1000 are examples, and not limitations, as other messages may be used to provide RIS capabilities to network stations. The messages may utilize existing communication protocols such as NAS LPP/NPP, NRPPa, Radio Resource Control (RRC), and other protocols to propagate the RIS capabilities information. In an embodiment, a base station 902 such as a gNB, may be configured to perform an RIS capability inquiry 1002 with one or more RISes, such as the first RIS 910 and the second RIS 912. The base station 902 may be the SgNB described in FIG. 8. The inquiry 1002 may include an exchange of messages between the base station 902 and the RISes 910, 912. The messages may include RIS configuration information (e.g., make, model, version, etc.) and state information (e.g., operation status, limitations, special instructions, etc.). In an example, the RISes 910, 912 may be configured to provide operational parameters such as phase shift control accuracy, phase shift speed, beam shape information and reflected power loss or gain information. The operational parameters may be based on different frequency bands if the RIS has multiband capabilities. The base station 902 may provide one or more RIS capabilities messages 1004 to a location server such as the LMF 270.

The LMF 270 may be configured to utilize the received RIS capabilities information to adapt PRS configurations. For example, the RIS capabilities may impact the number and timing of PRS beams in a beam sweep procedure. The LMF 270 may provide one or more PRS configuration information messages 1006 to the base station based on the adapted PRS. The adaptation may include updated or modified PRS resource sets within one or more positioning frequency layers. The PRS configurations and other RIS capability information may also be provided to the UE via assistance data 1008. For example, the assistance data may include the AoD and RIS reflected power information to enable the UE to improve positioning accuracy and compute SRS power based on the capabilities of the RIS.

Figure 11:
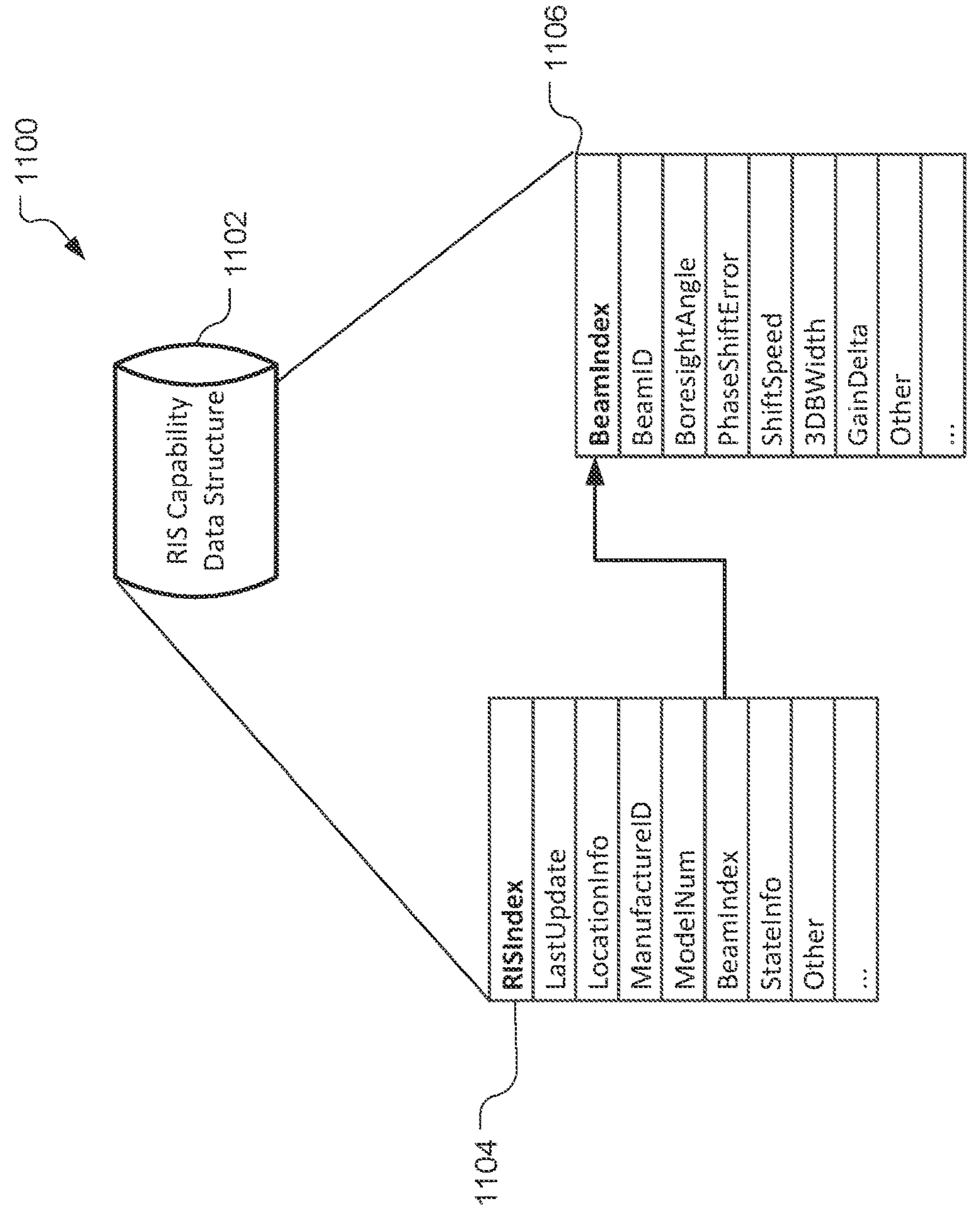
FIG. 11 is an example data structure for operational adaption of RIS based positioning.

Referring to FIG. 11, an example data structure 1100 for operational adaptation of RIS based positioning is shown. Some or all of the elements of the data structure 1100 may persist on the UE 302, the base station 304 and the network entity 306, such as the LMF 270. The data structure 1100 may be disposed on a local or remote (e.g., cloud based) memory device 1102 such as a solid state or mechanical hard drive, and may include a plurality of data records stored in a relational database application (e.g., Amazon Aurora, Oracle Database, Microsoft SQL Server, MySQL, DB2, etc.), or stored in one or more flat files (e.g., JSON, XML, CSV, etc.). The table structures and fields in the data structure 1100 are examples, and not a limitation, as other data fields, tables, stored procedures and indexing schemas may be used to construct the data structure 1100. In an example, the data structure 1100 may include a RIS table 1104 and a linked beam table 1106. The RIS table 1104 may include fields associated with a RIS installation and the beam table 1106 may include fields associated with the beams generated by a linked RIS. The RIS table 1104 may include fields such as an RISIndex to uniquely identify the RIS. A LastUpdate field may include date and time information associated with the last change in state of the RIS or other configuration change information. A LocationInfo field may indicate the geographic coordinates (e.g., lat/long/alt) of the RIS. ManufactureID and ModelNum fields may be used to generally classify the RIS based on manufacturers specifications. A StateInfo field may be used to indicate a current operating state of the RIS (e.g., operational, limitations, or other configuration information). In an example, a BeamIndex field may be used as reference to the beam table 1106. Other fields may also be used to identify the capabilities of an RIS.

The beam table 1106 may include fields associated with the beam capabilities of the linked RIS. A BeamID field may be used to identify a beam within the RIS. A BoresightAngle field may indicate the true or relative angle of the reflected beam. 3D RISes may also include an ElevationAngle field to indicate the elevation of a reflected beam. A PhaseShiftError field may indicate the maximum phase shift error with a time duration associated with the beam. A ShiftSpeed field may indicate the duration in time or symbols or slots to generate the beam. A 3DBWidth field may indicate the 3 dB beamwidth of the beam. A GainDelta field may be used to indicate the power gain or loss associated with the beam. Other fields may also be used to categorize the capabilities of the RIS and/or beam combination to enable PRS adaption as described herein.

Figure 12:
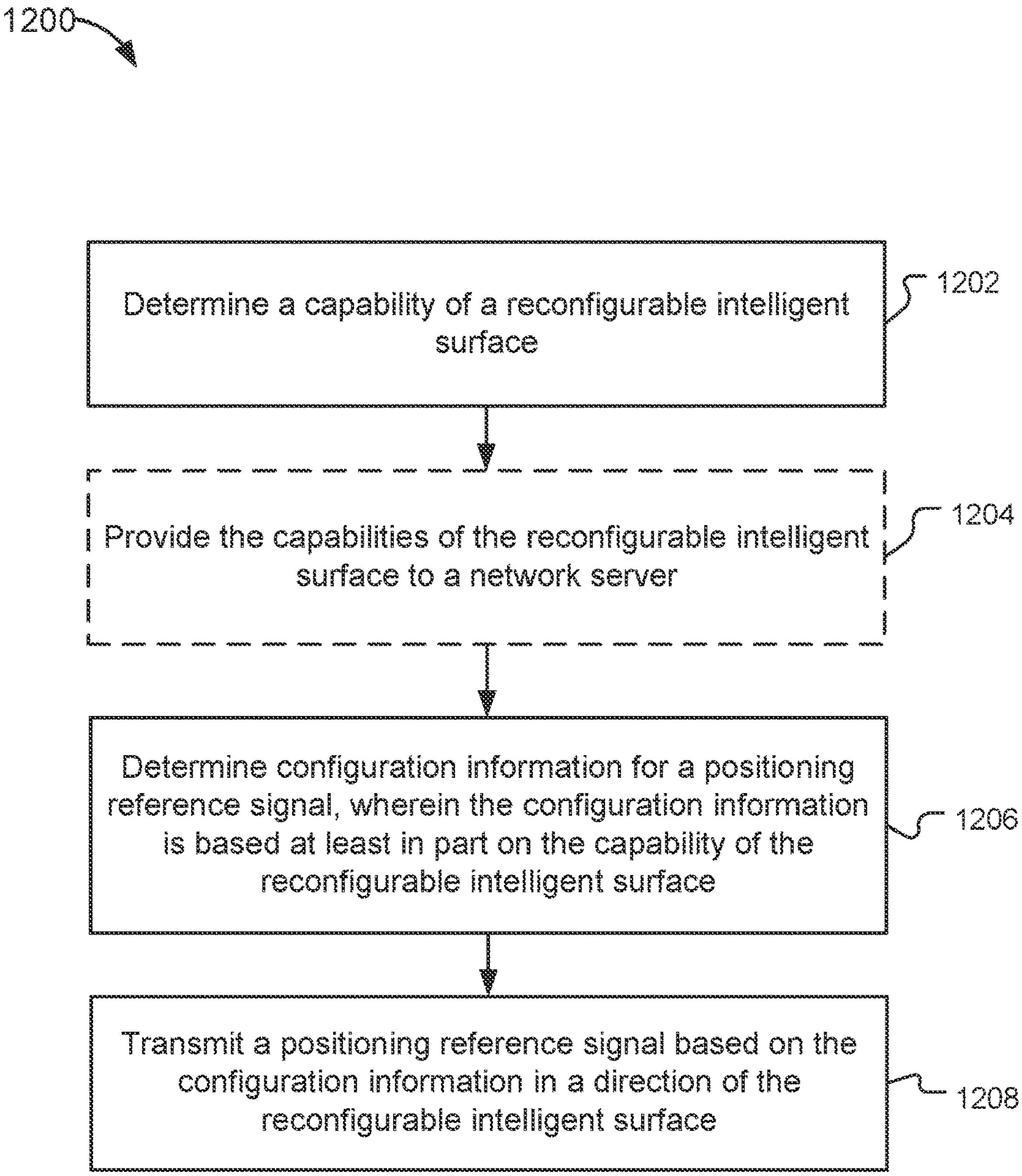
FIG. 12 is a flow chart of an example method for transmitting a reference signal based on the capabilities of a RIS.

Referring to FIG. 12, with further reference to FIGS. 1-11, a method 1200 for transmitting a reference signal based on the capabilities of a reconfigurable intelligent surface includes the stages shown. The method 1200 is, however, an example and not limiting. The method 1200 may be altered, e.g., by having stages added, removed, rearranged, combined, performed concurrently, and/or having single stages split into multiple stages. For example, providing capability information to a network server at stage 1204 is optional.

At stage 1202, the method includes determining a capability of a reconfigurable intelligent surface. A base station 304 is a means for determining the capabilities of an RIS. For example, the base station 902 (e.g., a SgNB) may perform an RIS capability inquiry 1002 with one or more RISes. The inquiry 1002 may include an exchange of messages between the base station 902 and the RISes. In an example, the capabilities of the RISes may be available from other networked entities, such as the LMF 270, other edge computing devices, web services or other location based service providers, and the base station 902 may be configured to obtain RIS capability information from the networked resource. The capability information may include RIS configuration information (e.g., make, model, version, etc.) and state information (e.g., operation status, limitations, special instructions, etc.). Other specific RIS capability information may also be available to the base station 902. For example, operational and/or multiband parameters such as phase shift control accuracy, phase shift speed, beam shape information and reflected power loss or gain information may be obtained by the base station 902 from a RIS or other network resource.

At stage 1204, the method may optionally include providing the capabilities of the reconfigurable intelligent surface to a network server. The base station 304 is a means for providing the capabilities of the RIS to the network server. In an embodiment, the base station 902 may provide one or more RIS capabilities messages 1004 to a location server such as the LMF 270. The messages may utilize existing communication protocols such as NAS LPP/NPP. NRPPa, and other protocols to propagate the RIS capabilities information within a network. In an example, the capabilities on an RIS may be stored in a data structure 1100 on the network server. The network server may be configured to provide the RIS capabilities to other stations in the network. For example, a base station may obtain the capabilities of a RIS from the LMF 270 as described at stage 1202.

At stage 1206, the method includes determining configuration information for a positioning reference signal, wherein the configuration information is based at least in part on the capability of the reconfigurable intelligent surface. The base station 304 is a means for determining configuration information for a PRS. In an example, the base station 902, the LMF 270, or another network entity may utilize the RIS capabilities information to adapt PRS configurations. The accuracy of the phase shift control and/or the beam shape of signals reflected from a RIS may be used to determine a number of PRS beams to be configured for a PRS beam sweep. The speed of the phase shift control may be utilized to select a "PRS-Resource TimeGap" value such that the PRS-ResourceTimeGap≥x, where 'x' is based on the different phase shift speeds (e.g., $\Delta t_A$, $\Delta t_B$), and may be translated in the unit of slots based on the "PRS-Resource TimeGap" information element as defined in existing industry standards. The adaptation may include updated or modified PRS resource sets within one or more positioning frequency layers. Other adaptations of PRS configuration elements may also be used based on the capabilities of the RISes. In an embodiment, the LMF 270 may provide the adapted PRS configurations to the base station 902 via one or more PRS configuration information messages 1006.

At stage 1208, the method includes transmitting a positioning reference signal based on the configuration information in a direction of the reconfigurable intelligent surface. The base station 304 is a means for transmitting a PRS. The configuration information enables an adapted PRS transmission to utilize the RIS. Referring to FIG. 9A, the first beam 904*a* may be a PRS that is configured based on the capabilities of the first RIS 910. For example, the PRS-Resource-TimeGap value of a PRS may be modified based on the phase shift speed of the RIS. The PRS configuration of the first beam 904*a* may include other changes based on the capabilities of the first RIS 910.

In an aspect, the method 1200 may include one or more of the following features. Determining the capability of the reconfigurable intelligent surface may include determining an accuracy of a phase shift control of the reconfigurable intelligent surface. Determining the capability of the reconfigurable intelligent surface may include determining a speed of a phase shift control of the reconfigurable intelligent surface. Determining the capability of the reconfigurable intelligent surface may include determining a beam shape of a beam reflected from the reconfigurable intelligent surface. The beam shape of the beam reflected from the reconfigurable intelligent surface may be based on a 3 dB beamwidth. Determining the capability of the reconfigurable intelligent surface may include determining a power loss or a power gain of a beam reflected from the reconfigurable intelligent surface. Determining configuration information for the positioning reference signal may include determining a number of positioning reference signals to transmit in a positioning reference signal beam sweep. Determining configuration information for the positioning reference signal may include determining a time gap between transmitting two or more positioning reference signals. Determining the capability of the reconfigurable intelligent surface may include receiving capability information from a network server. Determining the capability of the reconfigurable intelligent surface may include receiving capability information from the reconfigurable intelligent surface.

Figure 13:
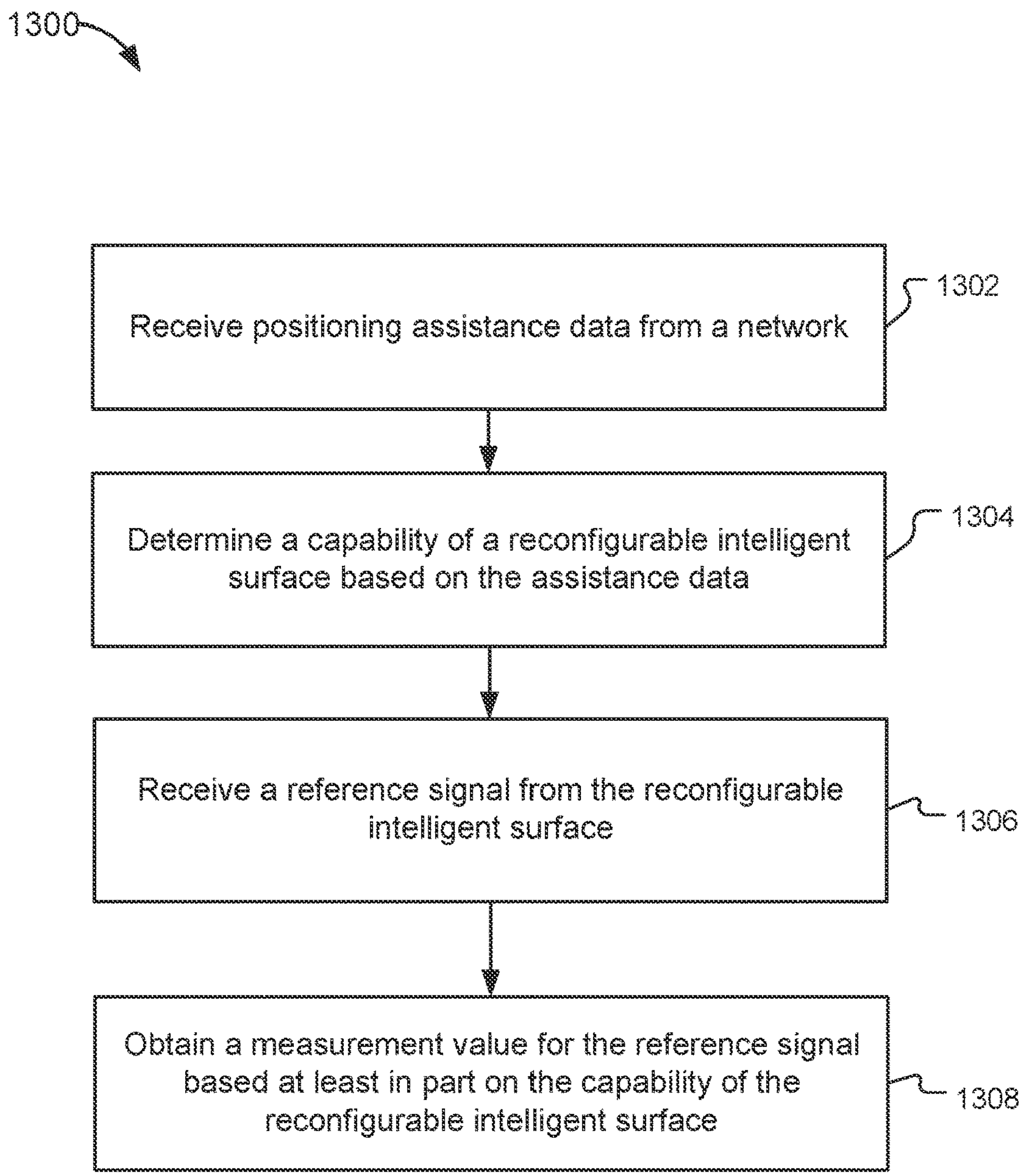
FIG. 13 is a flow chart of an example method for obtaining reference signal measurements based on the capabilities of a RIS.

Referring to FIG. 13, with further reference to FIGS. 1-11, a method 1300 for obtaining reference signal measurements based on the capabilities of a reconfigurable intelligent surface includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes receiving positioning assistance data from a network. The UE 302 is a means for receiving the assistance data. In an embodiment, a network server such as the LMF 270 may be configured to provide assistance data including RIS capabilities to a UE. The assistance data may include the AoD and RIS reflected power information to enable the UE to improve positioning accuracy and compute SRS power based on the capabilities of the RIS. In an embodiment, the assistance data may include one or more fields in the data structure 1100. In an example, one or more records in the data structure 1100 may persist in the memory 340 in the UE 302. Other data formats may also be used to store the RIS capabilities information.

At stage 1304, the method includes determining a capability of a reconfigurable intelligent surface based on the assistance data. The UE 302 is a means for determining the capability of a RIS based on assistance data. In an example, the assistance data may include RIS specific parameters such as boresight angle, phase shift error, shift speed, beam shape information, and beam power information. The UE 302 may be configured to parse and store the RIS parameters in the assistance data to a local memory for use in subsequent measurement computations.

At stage 1306, the method includes receiving a reference signal from the reconfigurable intelligent surface. The UE 302 is a means for receiving the reference signal. In an embodiment, the reference signal may be a reflected adapted PRS, such as the first reflected beam 914, based on the first beam 904*a* transmitted by the base station 902 and reflected by the first RIS 910. The UE 302 may detect other beams reflected from the first RIS 910 and/or the second RIS 912, such as the second reflected beam 916. The beam timing information may be included in the assistance data and the UE 302 may utilized the timing information when attempting to receive PRS from neighboring base stations and RISes.

At stage 1308, the method includes obtaining a measurement value for the reference signal based at least in part on the capability of the reconfigurable intelligent surface. The UE 302 is a means for obtaining the measurement value. In an embodiment, the phase shift accuracy and beam shape information provided in the assistance data may be utilized to determine AoD information. The RIS beam shape information in the assistance data, such as 3 dB beam width, may be used to enable the UE to compute an AoD estimate, for example, through interpolation across a signal measurement. The phase shift error information in the assistance data may be utilized as an uncertainty value associated with the RIS beam width information. The UE 302 may obtain ToA and RSTD measurements as previously described. Other RIS capability information may also be utilized by the UE 302. For example, the assistance data may include the speed of phase shift control information to enable power saving processes on a UE. The power information may be utilized by the UE for UL-SRS power control. In an embodiment, the UE may be configured to obtain Receive Signal Strength Indication (RSSI) measurements based on the power of the reflected signal and modify the measurement based on the RIS capability information.

In an aspect, the method 1300 may include one or more of the following features. Determining the capability of the reconfigurable intelligent surface may include determining an accuracy of a phase shift control of the reconfigurable intelligent surface. Determining the capability of the reconfigurable intelligent surface may include determining a speed of a phase shift control of the reconfigurable intelligent surface. Determining the capability of the reconfigurable intelligent surface may include determining a beam shape the reference signal. The beam shape of the reference signal may be based on a 3 dB beamwidth. Determining the capability of the reconfigurable intelligent surface may include determining a power loss or a power gain of the reference signal. Determining a transmit power for an uplink reference signal may be based at least in part on the power loss or the power gain of the reference signal. Obtaining the measurement value for the reference signal may include determining an angle of departure of the reference signal. Obtaining the measurement value for the reference signal may include determining an uncertainty of a beamwidth of the reference signal. Obtaining the measurement value for the reference signal may include determining a time of arrival of the reference signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM. EEPROM. CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Implementation examples are described in the following numbered clauses:

Clause 1. A method of wireless communication performed by a base station, comprising: determining a capability of a reconfigurable intelligent surface; determining configuration information for a positioning reference signal, wherein the configuration information is based at least in part on the capability of the reconfigurable intelligent surface; and transmitting a positioning signal based on the configuration information in a direction of the reconfigurable intelligent surface.

Clause 2. The method of clause 1 further comprising providing the capability of the reconfigurable intelligent surface to a network server.

Clause 3. The method of either clause 1 or 2 wherein the determining the capability of the reconfigurable intelligent surface includes determining an accuracy of a phase shift control of the reconfigurable intelligent surface.

Clause 4. The method of any of clauses 1-3 wherein the determining the capability of the reconfigurable intelligent surface includes determining a speed of a phase shift control of the reconfigurable intelligent surface.

Clause 5. The method of any of clauses 1-4 wherein the determining the capability of the reconfigurable intelligent surface includes determining a beam shape of a beam reflected from the reconfigurable intelligent surface.

Clause 6. The method of any of clauses 1-5 wherein the beam shape of the beam reflected from the reconfigurable intelligent surface is based on a 3 dB beamwidth.

Clause 7. The method of any of clauses 1-6 wherein the determining the capability of the reconfigurable intelligent surface includes determining a power loss or a power gain of a beam reflected from the reconfigurable intelligent surface.

Clause 8. The method of any of clauses 1-7 wherein the determining configuration information for the positioning reference signal includes determining a number of positioning reference signals to transmit in a positioning reference signal beam sweep.

Clause 9. The method of any of clauses 1-8 wherein the determining configuration information for the positioning reference signal includes determining a time gap between transmitting two or more positioning reference signals.

Clause 10. The method of any of clauses 1-9 wherein the determining the capability of the reconfigurable intelligent surface includes receiving capability information from a network server.

Clause 11. The method of any of clauses 1-10 wherein determining the capability of the reconfigurable intelligent surface includes receiving capability information from the reconfigurable intelligent surface.

Clause 12. A method of wireless communication performed by a user equipment, comprising: receiving positioning assistance data from a network; determining a capability of a reconfigurable intelligent surface based on the positioning assistance data; receiving a reference signal from the reconfigurable intelligent surface; and obtaining a measurement value for the reference signal based at least in part on the capability of the reconfigurable intelligent surface.

Clause 13. The method of clause 12 wherein the determining the capability of the reconfigurable intelligent surface includes determining an accuracy of a phase shift control of the reconfigurable intelligent surface.

Clause 14. The method of either clause 12 or 13 wherein the determining the capability of the reconfigurable intelligent surface includes determining a speed of a phase shift control of the reconfigurable intelligent surface.

Clause 15. The method of any of clauses 12-14 wherein the determining the capability of the reconfigurable intelligent surface includes determining a beam shape the reference signal.

Clause 16. The method of any of clauses 12-15 wherein the beam shape of the reference signal is based on a 3 dB beamwidth.

Clause 17. The method of any of clauses 12-16 wherein the determining the capability of the reconfigurable intelligent surface includes determining a power loss or a power gain of the reference signal.

Clause 18. The method of any of clauses 12-17 further comprising determining a transmit power for an uplink reference signal based at least in part on the power loss or the power gain of the reference signal.

Clause 19. The method of any of clauses 12-18 wherein the obtaining the measurement value for the reference signal includes determining an angle of departure of the reference signal.

Clause 20. The method of any of clauses 12-19 wherein the obtaining the measurement value for the reference signal includes determining an uncertainty of a beamwidth of the reference signal.

Clause 21. The method of any of clauses 12-20 wherein the obtaining the measurement value for the reference signal includes determining a time of arrival of the reference signal.

Clause 22. An apparatus, comprising: a memory; at least one transceiver: at least one processor communicatively coupled to the memory and the at least one transceiver, and configured to: determine a capability of a reconfigurable intelligent surface; determine configuration information for a positioning reference signal, wherein the configuration information is based at least in part on the capability of the reconfigurable intelligent surface; and transmit a positioning signal based on the configuration information in a direction of the reconfigurable intelligent surface.

Clause 23. The apparatus of clause 22 wherein the at least one processor is further configured to provide the capability of the reconfigurable intelligent surface to a network server.

Clause 24. The apparatus of either of clauses 22 or 23 wherein the at least one processor is further configured to determine an accuracy of a phase shift control of the reconfigurable intelligent surface.

Clause 25. The apparatus of any of clauses 22-24 wherein the at least one processor is further configured to determine a speed of a phase shift control of the reconfigurable intelligent surface.

Clause 26. The apparatus of any of clauses 22-25 wherein the at least one processor is further configured to determine a beam shape of a beam reflected from the reconfigurable intelligent surface.

Clause 27. The apparatus of any of clauses 22-26 wherein the beam shape of the beam reflected from the reconfigurable intelligent surface is based on a 3 dB beamwidth.

Clause 28. The apparatus of any of clauses 22-27 wherein the at least one processor is further configured to determine a power loss or a power gain of a beam reflected from the reconfigurable intelligent surface.

Clause 29. The apparatus of any of clauses 22-28 wherein the at least one processor is further configured to determine a number of positioning reference signals to transmit in a positioning reference signal beam sweep.

Clause 30. The apparatus of any of clauses 22-29 wherein the at least one processor is further configured to determine a time gap between transmitting two or more positioning reference signals.

Clause 31. The apparatus of any of clauses 22-30 wherein the at least one processor is further configured to receive capability information from a network server.

Clause 32. The apparatus of any of clauses 22-31 wherein the at least one processor is further configured to receive capability information from the reconfigurable intelligent surface.

Clause 33. An apparatus, comprising: a memory; at least one transceiver; at least one processor communicatively coupled to the memory and the at least one transceiver, and configured to: receive positioning assistance data from a network; determine a capability of a reconfigurable intelligent surface based on the positioning assistance data, receive a reference signal from the reconfigurable intelligent surface; and obtain a measurement value for the reference signal based at least in part on the capability of the reconfigurable intelligent surface.

Clause 34. The apparatus of clause 33 wherein the at least one processor is further configured to determine an accuracy of a phase shift control of the reconfigurable intelligent surface.

Clause 35. The apparatus of either clause 33 or 34 wherein the at least one processor is further configured to determine a speed of a phase shift control of the reconfigurable intelligent surface.

Clause 36. The apparatus of any of the clauses 33-35 wherein the at least one processor is further configured to determine a beam shape the reference signal.

Clause 37. The apparatus of any of the clauses 33-36 wherein the beam shape of the reference signal is based on a 3 dB beamwidth.

Clause 38. The apparatus of any of clauses 33-36 wherein the at least one processor is further configured to determine a power loss or a power gain of the reference signal.

Clause 39. The apparatus of any of clauses 33-38 wherein the at least one processor is further configured to determine a transmit power for an uplink reference signal based at least in part on the power loss or the power gain of the reference signal.

Clause 40. The apparatus of any of clauses 33-39 wherein the at least one processor is further configured to determine an angle of departure of the reference signal.

Clause 41. The apparatus of any of clause 33-40 wherein the at least one processor is further configured to determine an uncertainty of a beamwidth of the reference signal.

Clause 42. The apparatus of any of clauses 33-41 wherein the at least one processor is further configured to determine a time of arrival of the reference signal.

Clause 43. An apparatus for wireless communication, comprising: means for determining a capability of a reconfigurable intelligent surface; means for determining configuration information for a positioning reference signal, wherein the configuration information is based at least in part on the capability of the reconfigurable intelligent surface; and means for transmitting a positioning signal based on the configuration information in a direction of the reconfigurable intelligent surface.

Clause 44. An apparatus for wireless communication, comprising: means for receiving positioning assistance data from a network: means for determining a capability of a reconfigurable intelligent surface based on the positioning assistance data; means for receiving a reference signal from the reconfigurable intelligent surface; and means for obtaining a measurement value for the reference signal based at least in part on the capability of the reconfigurable intelligent surface.

Clause 45. A non-transitory processor-readable storage medium comprising processor-readable instructions to cause one or more processors to transmit a positioning signal, comprising: code for determining a capability of a reconfigurable intelligent surface: code for determining configuration information for a positioning reference signal, wherein the configuration information is based at least in part on the capability of the reconfigurable intelligent surface, and code for transmitting the positioning signal based on the configuration information in a direction of the reconfigurable intelligent surface.

Clause 46. A non-transitory processor-readable storage medium comprising processor-readable instructions to cause one or more processors to measure a reference signal, comprising: code for receiving positioning assistance data from a network;

code for determining a capability of a reconfigurable intelligent surface based on the positioning assistance data, code for receiving the reference signal from the reconfigurable intelligent surface: and code for obtaining a measurement value for the reference signal based at least in part on the capability of the reconfigurable intelligent surface.

What is claimed is:

1. A method of wireless communication performed by a base station, comprising:

determining a capability of a reconfigurable intelligent surface, wherein the capability comprises at least one of:

an accuracy or a speed of a phase shift control of the reconfigurable intelligent surface, or a power loss or a power gain of a beam reflected from the reconfigurable intelligent surface;

determining configuration information for a positioning reference signal, wherein the configuration information is based at least in part on the capability of the reconfigurable intelligent surface; and transmitting a positioning signal based on the configuration information in a direction of the reconfigurable intelligent surface.

2. The method of claim 1 further comprising:

providing the capability of the reconfigurable intelligent surface to a network server.

3. The method of claim 1 wherein determining the capability of the reconfigurable intelligent surface comprises:

determining a beam shape of a beam reflected from the reconfigurable intelligent surface.

4. The method of claim 3, wherein the beam shape of the beam reflected from the reconfigurable intelligent surface is based on a 3 dB beamwidth.

5. The method of claim 1 wherein determining configuration information for the positioning reference signal comprises:

determining a number of positioning reference signals to transmit in a positioning reference signal beam sweep.

6. The method of claim 1 wherein determining configuration information for the positioning reference signal comprises:

determining a time gap between transmitting two or more positioning reference signals.

7. The method of claim 1 wherein determining the capability of the reconfigurable intelligent surface comprises:

receiving a message comprising the capability information from a network server.

8. The method of claim 1 wherein determining the capability of the reconfigurable intelligent surface comprises:

receiving a message comprising the capability from the reconfigurable intelligent surface.

9. A method of wireless communication performed by a user equipment, comprising:

receiving positioning assistance data from a network;

determining a capability of a reconfigurable intelligent surface based on the positioning assistance data, wherein the capability comprises at least one of:

an accuracy or a speed of a phase shift control of the reconfigurable intelligent surface, or a power loss or a power gain of a beam reflected from the reconfigurable intelligent surface;

receiving a reference signal from the reconfigurable intelligent surface; and obtaining a measurement value for the reference signal based at least in part on the capability of the reconfigurable intelligent surface.

10. The method of claim 9 wherein determining the capability of the reconfigurable intelligent surface comprises:

determining a beam shape the reference signal.

11. The method of claim 10, wherein the beam shape of the reference signal is based on a 3 dB beamwidth.

12. The method of claim 9 further comprising:

determining a transmit power for an uplink reference signal based at least in part on the power loss or the power gain of the reference signal.

13. The method of claim 9 wherein obtaining the measurement value for the reference signal comprises:

determining an angle of departure of the reference signal.

14. The method of claim 9 wherein obtaining the measurement value for the reference signal comprises:

determining an uncertainty of a beamwidth of the reference signal.

15. The method of claim 9 wherein obtaining the measurement value for the reference signal comprises:

determining a time of arrival of the reference signal.

16. An apparatus, comprising:

a memory;

at least one transceiver; and at least one processor communicatively coupled to the memory and the at least one transceiver, and configured to:

determine a capability of a reconfigurable intelligent surface, wherein the capability comprises at least one of:

an accuracy or a speed of a phase shift control of the reconfigurable intelligent surface, or a power loss or a power gain of a beam reflected from the reconfigurable intelligent surface;

determine configuration information for a positioning reference signal, wherein the configuration information is based at least in part on the capability of the reconfigurable intelligent surface; and transmit a positioning signal based on the configuration information in a direction of the reconfigurable intelligent surface.

17. The apparatus of claim 16 wherein the at least one processor is further configured to:

determine a beam shape of a beam reflected from the reconfigurable intelligent surface.

18. An apparatus, comprising:

a memory;

at least one transceiver; and at least one processor communicatively coupled to the memory and the at least one transceiver, and configured to:

receive positioning assistance data from a network;

determine a capability of a reconfigurable intelligent surface based on the positioning assistance data, wherein the capability comprises at least one of:

an accuracy or a speed of a phase shift control of the reconfigurable intelligent surface, or a power loss or a power gain of a beam reflected from the reconfigurable intelligent surface;

receive a reference signal from the reconfigurable intelligent surface; and obtain a measurement value for the reference signal based at least in part on the capability of the reconfigurable intelligent surface.

19. The apparatus of claim 18 wherein the at least one processor is further configured to:

determine a beam shape the reference signal.

20. The apparatus of claim 18 wherein the at least one processor is further configured to:

determine an uncertainty of a beamwidth of the reference signal.

* * * * *